United States Patent
Suzuki et al.

(10) Patent No.: US 10,417,050 B2
(45) Date of Patent: Sep. 17, 2019

(54) APPARATUS AND METHOD TO CONTROL CALCULATION RESOURCES OF AN INFORMATION PROCESSING DEVICE BASED ON PREDICTIVE VALUES OF REFERENCE DATA

(71) Applicant: FUJITSU LIMITED, Kawasaki-shi, Kanagawa (JP)

(72) Inventors: Shigeto Suzuki, Kawasaki (JP); Hiroshi Endo, Atsugi (JP); Hiroyoshi Kodama, Isehara (JP); Hiroyuki Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 42 days.

(21) Appl. No.: 15/720,889

(22) Filed: Sep. 29, 2017

(65) Prior Publication Data

US 2018/0107520 A1    Apr. 19, 2018

(30) Foreign Application Priority Data

Oct. 18, 2016    (JP) ................. 2016-204744

(51) Int. Cl.
*G06F 9/50* (2006.01)

(52) U.S. Cl.
CPC .......... *G06F 9/5027* (2013.01); *G06F 9/5061* (2013.01); *G06F 9/5077* (2013.01); *Y02D 10/22* (2018.01); *Y02D 10/36* (2018.01)

(58) Field of Classification Search
CPC .... G06F 9/5027; G06F 9/5061; G06F 9/5077; Y02D 10/22; Y02D 10/36
See application file for complete search history.

(56) References Cited

U.S. PATENT DOCUMENTS 8,112,756 B2 *    2/2012    Cherkasova ............ G06F 9/505
                                                                708/1
8,312,460 B1 *    11/2012    Blanding ................ G06F 9/505
                                                                718/104

(Continued)

FOREIGN PATENT DOCUMENTS

JP    2006-520027    8/2006
JP    2012-133630    7/2012
JP    2014-164425    9/2014

OTHER PUBLICATIONS

"Filter Scheduler", http://docs.openstack.org/developer/nova/filter_scheduler.html, Internet Search performed Sep. 5, 2016, 7 pages.

(Continued)

*Primary Examiner* — Benjamin C Wu
(74) *Attorney, Agent, or Firm* — Xsensus LLP

(57) ABSTRACT

An apparatus stores plural pieces of reference data selected based on operation data input from a host OS executed by an information processing device. The apparatus selects one or more pieces of selection reference data from the plural pieces of reference data, based on a plurality of correlation coefficients which are calculated upon receiving a predictive demand and which respectively indicate correlations between predictive target reference data indicating reference data to be predicted and other reference data. The apparatus calculates predictive values of the predictive target reference data, based on the selected one or more pieces of selection reference data, and controls the plurality of calculation resources for the information processing device, based on the predictive values of the predictive target reference data and a predetermined reference value.

7 Claims, 23 Drawing Sheets

(56) References Cited

U.S. PATENT DOCUMENTS

| | | | |
|---|---|---|---|
| 2004/0143664 A1* | 7/2004 | Usa | G06F 9/5077 |
| | | | 709/226 |
| 2004/0181794 A1 | 9/2004 | Coleman et al. | |
| 2006/0294238 A1* | 12/2006 | Naik | G06F 9/5072 |
| | | | 709/226 |
| 2011/0061057 A1* | 3/2011 | Harris | G06F 9/5072 |
| | | | 718/104 |
| 2012/0079097 A1* | 3/2012 | Gopisetty | G06F 9/5083 |
| | | | 709/224 |
| 2014/0089495 A1* | 3/2014 | Akolkar | H04L 41/147 |
| | | | 709/224 |
| 2014/0244846 A1 | 8/2014 | Takehara et al. | |
| 2017/0235659 A1* | 8/2017 | Matsuki | G06F 11/1484 |
| | | | 714/47.2 |

OTHER PUBLICATIONS

"Cloud Warm Standby", http://www.slideshare.net/AmazonWebServicesJapan/aws-15753828, Internet Search performed Sep. 5, 2016, 58 pages (with Computer Generated English Translation).

"Enhanced Application Performance and Availability", http://www.vmware.com/jp/products/vsphere/enhanced-app-performance.html, Internet Search performed Sep. 5, 2016, 10 pages (with Computer Generated English Translation).

Haoyang Shen, et al. "A measure of credibility of solar power prediction", International Conference on Machine Learning and Applications; Dec. 2011, 13 pages.

\* cited by examiner

FIG. 4

| PHYSICAL HOST | VIRTUAL MACHINE | ... | TRANSMISSION/RECEPTION DATA AMOUNT | | | ... |
| --- | --- | --- | --- | --- | --- | --- |
| | | | BEFORE 20 min | BEFORE 10 min | CURRENT | |
| | | | 2016/4/8 14:40 | 2016/4/8 14:50 | 2016/4/8 15:00 | |
| xx.xx.xxx.xxx | aa.aa.aa.aaa | ... | ... | ... | ... | ... |
| | bb.bb.bbb.bbb | ... | ... | ... | ... | ... |
| | cc.cc.ccc.ccc | ... | ... | ... | ... | ... |
| | dd.dd.ddd.ddd | ... | ... | ... | ... | ... |
| | ee.ee.eee.eee | ... | ... | ... | ... | ... |
| | ff.ff.fff.fff | ... | ... | ... | ... | ... |
| | ... | ... | ... | ... | ... | ... |
| | HOST TOTAL | ... | ... | ... | ... | ... |
| ... | ... | ... | ... | ... | ... | ... |

FIG. 8

| PHYSICAL HOST | VIRTUAL MACHINE | ... | TRANSMISSION/RECEPTION DATA AMOUNT | | | ... | CPU USE RATE | | |
|---|---|---|---|---|---|---|---|---|---|
| | | | BEFORE 20 min 2016/4/8 14:40 | BEFORE 10 min 2016/4/8 14:50 | CURRENT 2016/4/8 15:00 | | BEFORE 20 min 2016/4/8 14:40 | BEFORE 10 min 2016/4/8 14:50 | CURRENT 2016/4/8 15:00 |
| xx.xx.xxx.xxx | aa.aa.aa.aaa | ... | ... | ... | ... | ... | ... | ... | ... |
| | bb.bb.bbb.bbb | ... | ... | ... | ... | ... | 25% | 15% | 20% |
| | cc.cc.ccc.ccc | ... | ... | ... | ... | ... | 50% | 40% | 10% |
| | dd.dd.ddd.ddd | ... | ... | ... | ... | ... | 36% | 86% | 46% |
| | ee.ee.eee.eee | ... | ... | ... | ... | ... | 68% | 52% | 10% |
| | ff.ff.fff.fff | ... | ... | ... | ... | ... | 90% | 60% | 40% |
| | ... | ... | ... | ... | ... | ... | 68% | 52% | 10% |
| | HOST TOTAL | ... | ... | ... | ... | ... | 90% | 80% | 70% |
| ... | | | | | | | | | |

CALCULATE CORRELATION COEFFICIENT

FIG. 9

| RANKING | CORRELATION COEFFICIENT | METRIC NAME | |
|---|---|---|---|
| 1 | 0.85 | MEMORY USE RATE | ⎫ METRIC WHICH IS USED FOR JIT MODELING |
| 2 | 0.83 | NUMBER OF DISK COMMANDS | |
| 3 | 0.76 | NETWORK TRANSMISSION/RECEPTION SPEED | |
| 4 | 0.62 | NUMBER OF DISK READING TIMES | |
| 5 | 0.55 | NUMBER OF DISK WRITING TIMES | ⎭ |
| ... | ... | ... | ⎫ METRIC WHICH IS NOT USED FOR JIT MODELING |
| 10 | 0.46 | AVERAGE DISK QUEUE LATENCY | |
| ... | ... | ... | ⎭ |

FIG. 10

| PHYSICAL HOST | VIRTUAL MACHINE | TRANSMISSION/RECEPTION DATA AMOUNT | | | | CPU USE RATE | | | |
|---|---|---|---|---|---|---|---|---|---|
| | | BEFORE 20 min 2016/4/8 14:40 | BEFORE 10 min 2016/4/8 14:50 | CURRENT 2016/4/8 15:00 | ... | BEFORE 20 min 2016/4/8 14:40 | BEFORE 10 min 2016/4/8 14:50 | CURRENT 2016/4/8 15:00 | PREDICTION AFTER 10 min 2016/4/8 15:10 |
| xx.xx.xxx.xxx | aa.aa.aa.aaa | ... | ... | ... | ... | ... | ... | ... | ... |
| | bb.bb.bbb.bbb | ... | ... | ... | ... | 25% | 15% | 20% | 25% |
| | cc.cc.ccc.ccc | ... | ... | ... | ... | 50% | 40% | 10% | 22% |
| | dd.dd.ddd.ddd | ... | ... | ... | ... | 36% | 86% | 46% | 55% |
| | ee.ee.eee.eee | ... | ... | ... | ... | 68% | 52% | 10% | 63% |
| | ff.ff.fff.fff | ... | ... | ... | ... | 90% | 60% | 40% | 150% |
| | ... | ... | ... | ... | ... | 68% | 52% | 10% | 63% |
| | HOST TOTAL | ... | ... | ... | ... | 90% | 80% | 70% | 30% |
| ... | ... | | | | | ... | ... | ... | ... |

PROXIMITY DATA SET
PAST DATA SET
LATEST DATA SET

FIG. 12

| PHYSICAL HOST | VIRTUAL MACHINE | ... | TRANSMISSION/RECEPTION DATA AMOUNT | | | ... | CPU USE RATE | | | |
|---|---|---|---|---|---|---|---|---|---|---|
| | | | BEFORE 2 min 2016/4/8 14:58 | BEFORE 1 min 2016/4/8 14:59 | CURRENT 2016/4/8 15:00 | | BEFORE 20 min 2016/4/8 14:40 | BEFORE 10 min 2016/4/8 14:50 | CURRENT 2016/4/8 15:00 | PREDICTION AFTER 10 min 2016/4/8 15:10 |
| xx.xx.xxx.xxx | aa.aa.aa.aaa | ... | | | | ... | ... | ... | ... | ... |
| | bb.bb.bbb.bbb | ... | | | | ... | 25% | 15% | 20% | 25% |
| | cc.cc.ccc.ccc | ... | | | | ... | 50% | 40% | 10% | 22% |
| | dd.dd.ddd.ddd | ... | | | | ... | 36% | 86% | 46% | 55% |
| | ee.ee.eee.eee | ... | | | | ... | 68% | 52% | 10% | 63% |
| | ff.ff.fff.fff | ... | | | | ... | 90% | 60% | 40% | 150% |
| | ... | ... | | | | ... | 68% | 52% | 10% | 63% |
| | HOST TOTAL | ... | | | | ... | 90% | 80% | 70% | 30% |
| ... | | | | | | | ... | | | |

FIG. 16

| PHYSICAL HOST | VIRTUAL MACHINE | ... | TRANSMISSION/RECEPTION DATA AMOUNT | | | | LATENCY | | |
|---|---|---|---|---|---|---|---|---|---|
| | | | BEFORE 20 min 2016/4/8 14:40 | BEFORE 10 min 2016/4/8 14:50 | CURRENT 2016/4/8 15:00 | ... | BEFORE 20 min 2016/4/8 14:40 | BEFORE 10 min 2016/4/8 14:50 | CURRENT 2016/4/8 15:00 |
| xx.xx.xxx.xxx | aa.aa.aa.aaa | ... | ... | ... | ... | ... | ... | ... | ... |
| | bb.bb.bbb.bbb | ... | ... | ... | ... | ... | 0.1 msec | 0.8 msec | 0.5 msec |
| | cc.cc.ccc.ccc | ... | ... | ... | ... | ... | 0.2 msec | 0.9 msec | 0.6 msec |
| | dd.dd.ddd.ddd | ... | ... | ... | ... | ... | 0.3 msec | 1.0 msec | 0.7 msec |
| | ee.ee.eee.eee | ... | ... | ... | ... | ... | 0.4 msec | 0.1 msec | 0.8 msec |
| | ff.ff.fff.fff | ... | ... | ... | ... | ... | 0.5 msec | 0.2 msec | 0.9 msec |
| | ... | ... | ... | ... | ... | ... | 0.6 msec | 0.3 msec | 1.0 msec |
| | HOST TOTAL | ... | ... | ... | ... | ... | 0.7 msec | 0.4 msec | 0.1 msec |
| ... | | | | | | | ... | ... | ... |

CALCULATE CORRELATION COEFFICIENT

FIG. 17

| PHYSICAL HOST | VIRTUAL MACHINE | ... | TRANSMISSION/RECEPTION DATA AMOUNT | | | ... | LATENCY | | | |
|---|---|---|---|---|---|---|---|---|---|---|
| | | | BEFORE 20 min 2016/4/8 14:40 | BEFORE 10 min 2016/4/8 14:50 | CURRENT 2016/4/8 15:00 | | BEFORE 20 min 2016/4/8 14:40 | BEFORE 10 min 2016/4/8 14:50 | CURRENT 2016/4/8 15:00 | PREDICTION AFTER 10 min 2016/4/8 15:10 |
| xx.xx.xxx.xxx | aa.aa.aa.aaa | ... | ... | ... | ... | ... | 0.1 msec | 0.8 msec | 0.5 msec | 0.2 msec |
| | bb.bb.bbb.bbb | ... | ... | ... | ... | ... | 0.2 msec | 0.9 msec | 0.6 msec | 0.3 msec |
| | cc.cc.ccc.ccc | ... | ... | ... | ... | ... | 0.3 msec | 1.0 msec | 0.7 msec | 0.4 msec |
| | dd.dd.ddd.ddd | ... | ... | ... | ... | ... | 0.4 msec | 0.1 msec | 0.8 msec | 0.5 msec |
| | ee.ee.eee.eee | ... | ... | ... | ... | ... | 0.5 msec | 0.2 msec | 0.9 msec | 0.6 msec |
| | ff.ff.fff.fff | ... | ... | ... | ... | ... | 0.6 msec | 0.3 msec | 1.0 msec | 0.7 msec |
| | ... | ... | ... | ... | ... | ... | ... | ... | ... | ... |
| | HOST TOTAL | ... | ... | ... | ... | ... | 0.7 msec | 0.4 msec | 0.1 msec | 0.8 msec |
| ... | ... | | | | | | ... | ... | ... | ... |

PROXIMITY DATA SET
PAST DATA SET
LATEST DATA SET

FIG. 20

| PHYSICAL HOST | VIRTUAL MACHINE | ... | TRANSMISSION/RECEPTION DATA AMOUNT | | | ... | THROUGHPUT | | |
|---|---|---|---|---|---|---|---|---|---|
| | | | BEFORE 20 min 2016/4/8 14:40 | BEFORE 10 min 2016/4/8 14:50 | CURRENT 2016/4/8 15:00 | | BEFORE 20 min 2016/4/8 14:40 | BEFORE 10 min 2016/4/8 14:50 | CURRENT 2016/4/8 15:00 |
| xx.xx.xxx.xxx | aa.aa.aa.aaa | ... | ... | ... | ... | ... | 415 ops/sec | 450 ops/sec | 485 ops/sec |
| | bb.bb.bbb.bbb | ... | ... | ... | ... | ... | 420 ops/sec | 455 ops/sec | 490 ops/sec |
| | cc.cc.ccc.ccc | ... | ... | ... | ... | ... | 425 ops/sec | 460 ops/sec | 495 ops/sec |
| | dd.dd.ddd.ddd | ... | ... | ... | ... | ... | 430 ops/sec | 465 ops/sec | 500 ops/sec |
| | ee.ee.eee.eee | ... | ... | ... | ... | ... | 435 ops/sec | 470 ops/sec | 505 ops/sec |
| | ff.ff.fff.fff | ... | ... | ... | ... | ... | 440 ops/sec | 475 ops/sec | 510 ops/sec |
| | ... | ... | ... | ... | ... | ... | 445 ops/sec | 480 ops/sec | 515 ops/sec |
| | HOST TOTAL | ... | ... | ... | ... | ... | ... | ... | ... |

CALCULATE CORRELATION COEFFICIENT

FIG. 21

| PHYSICAL HOST | VIRTUAL MACHINE | ... | TRANSMISSION/RECEPTION DATA AMOUNT | | | ... | THROUGHPUT | | | PREDICTION AFTER 10 min |
|---|---|---|---|---|---|---|---|---|---|---|
| | | | BEFORE 20 min 2016/4/8 14:40 | BEFORE 10 min 2016/4/8 14:50 | CURRENT 2016/4/8 15:00 | | BEFORE 20 min 2016/4/8 14:40 | BEFORE 10 min 2016/4/8 14:50 | CURRENT 2016/4/8 15:00 | 2016/4/8 15:10 |
| xx.xx.xxx.xxx | aa.aa.aa.aaa | ... | ... | ... | ... | ... | ... | ... | ... | ... |
| | bb.bb.bbb.bbb | ... | ... | ... | ... | ... | 415 ops/sec | 450 ops/sec | 485 ops/sec | 520 ops/sec |
| | cc.cc.ccc.ccc | ... | ... | ... | ... | ... | 420 ops/sec | 455 ops/sec | 490 ops/sec | 525 ops/sec |
| | dd.dd.ddd.ddd | ... | ... | ... | ... | ... | 425 ops/sec | 460 ops/sec | 495 ops/sec | 530 ops/sec |
| | ee.ee.eee.eee | ... | ... | ... | ... | ... | 430 ops/sec | 465 ops/sec | 500 ops/sec | 535 ops/sec |
| | ff.ff.fff.fff | ... | ... | ... | ... | ... | 435 ops/sec | 470 ops/sec | 505 ops/sec | 540 ops/sec |
| | ... | ... | ... | ... | ... | ... | 440 ops/sec | 475 ops/sec | 510 ops/sec | 545 ops/sec |
| | HOST TOTAL | ... | ... | ... | ... | ... | 445 ops/sec | 480 ops/sec | 515 ops/sec | 550 ops/sec |
| ... | | | | | | | ... | ... | ... | ... |

PROXIMITY DATA SET
PAST DATA SET
LATEST DATA SET

APPARATUS AND METHOD TO CONTROL CALCULATION RESOURCES OF AN INFORMATION PROCESSING DEVICE BASED ON PREDICTIVE VALUES OF REFERENCE DATA

CROSS-REFERENCE TO RELATED APPLICATION

This application is based upon and claims the benefit of priority of the prior Japanese Patent Application No. 2016-204744, filed on Oct. 18, 2016, the entire contents of which are incorporated herein by reference.

FIELD

The embodiments discussed herein are related to apparatus and method to control calculation resources of an information processing device based on predictive values of reference data.

BACKGROUND

In the related art, there is provided a technology for monitoring calculation resources of a data center and autonomously controlling the calculation resources which are allocated to a virtual machine (VM) in the data center such that a service level agreement (SLA) is satisfied.

As the related art, there is provided a technology for determining and outputting an upper limit value of bandwidth usage amount for each network path which is set based on, for example, database (DB) measurement information and virtual DB server configuration information. In addition, for example, there is a technology for determining whether or not to change the number of processes which are allocated to each program module based on a result of measurement of a load for each program module. In addition, for example, there is a technology for predicting a future work-load level based on data associated with computing environments, and performing one or more actions in a case where it is estimated that current resource deployment is insufficient or excessive to satisfy the future work-load level.

Japanese Laid-open Patent Publication No. 2012-133630, Japanese Laid-open Patent Publication No. 2014-164425, and Japanese National Publication of International Patent Application No. 2006-520027 are examples of the related art.

SUMMARY

According to an aspect of the invention, an apparatus manages an information processing device including a plurality of calculation resources. The apparatus stores plural pieces of reference data selected based on operation data input from a host operating system (OS) executed by the information processing device. The apparatus selects one or more pieces of selection reference data from the plural pieces of reference data, based on a plurality of correlation coefficients which are calculated upon receiving a predictive demand and which respectively indicate correlations between predictive target reference data indicating reference data to be predicted and other reference data. The apparatus calculates predictive values of the predictive target reference data, based on the selected one or more pieces of selection reference data, and controls the plurality of calculation resources for the information processing device, based on the predictive values of the predictive target reference data and a predetermined reference value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a data structure of time-series data relevant to a metric system, according to an embodiment;

FIG. 8 is a diagram illustrating an example of an operation of a control device, according to an embodiment;

FIG. 9 is a diagram illustrating an example of an operation of a control device, according to an embodiment;

FIG. 10 is a diagram illustrating an example of an operation of a control device, according to an embodiment.

FIG. 12 is a diagram illustrating an example of reference data, according to an embodiment;

FIG. 16 is a diagram illustrating an example of an operation of a control device, according to an embodiment;

FIG. 17 is a diagram illustrating an example of an operation of a control device, according to an embodiment;

FIG. 20 is a diagram illustrating an example of an operation of a control device, according to an embodiment;

FIG. 21 is a diagram illustrating an example of an operation of a control device, according to an embodiment;

DESCRIPTION OF EMBODIMENTS

In the above-described technologies, in a case where loads of the calculation resources of the data center are changed, a time lag is generated until control is performed on the calculation resources of the data center from when the load of the calculation resources of the data center are changed, and thus there is a possibility that the SLA is not satisfied. For example, in a case where use rate of a central processing unit (CPU) which executes the VM increases, it takes a relatively long time until allocation of a CPU resource to the VM is changed from when the CPU use rate for the VM increases, and thus there is a possibility that the SLA is not satisfied.

It is desirable to reduce time which is taken until control is performed on calculation resources from when a state of an information processing device is changed.

Hereinafter, embodiments of a control device, a control method, and a control program will be described in detail with reference to the accompanying drawings.

Exemplary Example of Control Method According to Embodiment

Figure 1:
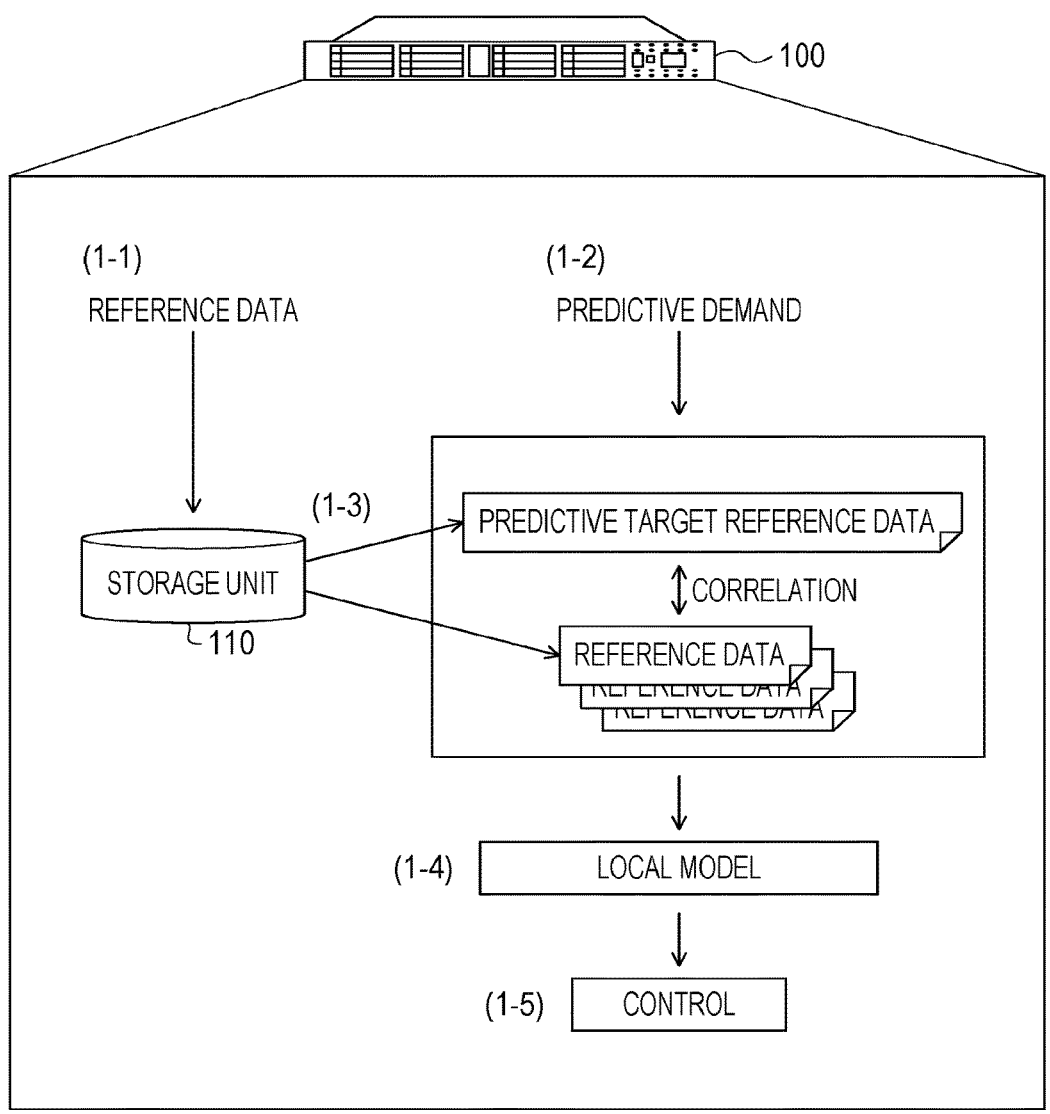
FIG. 1 is a diagram illustrating an example of a control method, according to an embodiment.

FIG. 1 is an explanatory diagram illustrating an exemplary example of a control method according to an embodiment. A control device 100 is a computer that manages an information processing device. The information processing device is a computer that includes a plurality of calculation resources. The information processing device is, for example, a server in a data center. The calculation resources include, for example, a CPU resource or the like of the server.

In service for using the data center, there is a tendency that it is demanded to secure usability desired by a service user so as to satisfy the SLA determined between a service provider and a service user. For example, it is conceivable that the SLA is satisfied in such a way that the CPU resource, which is able to secure performance of a VM that is desired by the user, is allocated to the VM, which is executed by the server in the data center and is used by a user.

In contrast, there is a tendency that it is desired to reduce the power consumption of the data center. For example, it is conceivable to reduce the power consumption by reducing the number of activated servers among servers in the data center. As described above, in service for using the data center, it is preferable to reduce power consumption of the data center while satisfying the SLA.

However, it is difficult to reduce the power consumption of the data center while satisfying the SLA. For example, in a case where the number of activated servers is reduced, there is a high possibility that a period, in which the SLA is not satisfied, is generated because the CPU resources allocated to the VM become insufficient in response to variation in the CPU use rate of the VM by lapse of time.

In contrast, for example, a case is conceivable where the period, in which the SLA is not satisfied, is suppressed from being generated by activating some servers in a hot stand-by state in preparation for variation in the CPU use rate of the VM. However, in this case, the power is consumed for the servers in the hot stand-by state, and thus it is difficult to efficiently reduce the power consumption of the data center.

Furthermore, for example, in a case where the variation in the CPU use rate of the VM is predicted and control is performed on the CPU resources which are allocated to the VM according to a result of the prediction, a case is conceivable where the power consumption of the data center is reduced while suppressing the period, in which the SLA is not satisfied, from being generated. However, even in this case, there is a possibility that a period, in which the SLA is not satisfied, is generated in a case where time is taken for predicting variation in the CPU use rate of the VM, and the control to be performed on the CPU resources allocated to the VM is not in time until a timing of the variation in the CPU use rate of the VM.

Here, in the embodiment, a control method, which is capable of efficiently reducing the power consumption of the data center while satisfying the SLA by predicting loads for the calculation resources of the data center by using just-in-time (JIT) modeling, will be described. Furthermore, according to the embodiment, it is possible to reduce the time which is taken for the JIT modeling, and to make a period, in which the SLA is not satisfied, be difficult to be generated by selecting a metric system, which is used in the JIT modeling, among a plurality of metric systems.

(1-1) The control device 100 stores plural pieces of reference data selected based on operation data, which are input from a host operating system (OS) executed by the information processing device, in a storage unit 110.

The operation data is time-series data relevant to performance values. For example, the operation data is time-series data relevant to the performance values which are acquired based on performance monitoring on the host OS executed by the information processing device and which indicate a state of the information processing device.

The reference data is time-series data relevant to prescribed metric systems selected from the operation data. In a case where a plurality of VMs exist in the data center, the reference data may include time-series data relevant to the prescribed metric systems of the respective VMs. For example, the metric systems include a CPU use rate, a memory use rate, the number of DISK commands, a network transmission/reception speed, the number of DISK reading times, the number of DISK writing times, average DISK queue latency, the amount of transmission/reception data, and the like of each of the VMs. Specifically, there may be 100 or more metric systems.

(1-2) The control device 100 receives a predictive demand. The predictive demand includes information which designates predictive target reference data which is a predictive target. The predictive target reference data is time-series data relevant to a metric system of the predictive target. For example, the predictive target reference data is time-series data relevant to the CPU use rate of the VM.

(1-3) The control device 100 selects one or more selection reference data from the plurality of reference data, based on a plurality of correlation coefficients which are calculated based on the input predictive demand and which indicate respective correlations between the predictive target reference data, which is the predictive target reference data, and other reference data.

For example, the control device 100 calculates a correlation coefficient between the time-series data relevant to the CPU use rate of the VM and time-series data relevant to the memory use rate. In addition, for example, the control device 100 calculates a correlation coefficient between the time-series data relevant to the CPU use rate of the VM and time-series data relevant to the number of DISK commands. In addition, for example, the control device 100 calculates a correlation coefficient between the time-series data relevant to the CPU use rate of the VM and time-series data relevant to the network transmission/reception speed.

In addition, for example, the control device 100 calculates a correlation coefficient between the time-series data relevant to the CPU use rate of the VM and time-series data relevant to the number of DISK reading times. In addition, for example, the control device 100 calculates a correlation coefficient between the time-series data relevant to the CPU use rate of the VM and time-series data relevant to the number of DISK writing times. In addition, the control device 100 calculates a correlation coefficient between the time-series data relevant to the CPU use rate of the VM and time-series data relevant to the average DISK queue latency.

Furthermore, for example, the control device 100 selects a prescribed number of reference data among the plurality of reference data in order that the calculated correlation coefficient is large. The control device 100 may select reference data, in which the calculated correlation coefficient is equal to or larger than a prescribed threshold, among the plurality of reference data.

(1-4) The control device 100 calculates a predictive value of the predictive target reference data, based on the one or more selected selection reference data. For example, the control device 100 uses one or more selected selection reference data for the JIT modeling, and calculates a predictive value that is acquired by predicting the CPU use rate of a VM, which is subsequently added to the time-series data relevant to the CPU use rate of the VM, by preparing a local model.

The JIT modeling is a technology for accumulating data of various metric systems, preparing the local model from data of the various metric systems at a past time point, at which L2 norm between data of current various metric systems is equal to or smaller than the prescribed threshold, and calculating predictive values of data of some metric systems.

(1-5) The control device 100 controls the calculation resources of the control device 100, based on the calculated predictive value of the predictive target reference data and predetermined reference values. For example, in a case where the predictive value of the CPU use rate of the VM is equal to or larger than the threshold, the control device 100 increases the calculation resources which are allocated to the VM. For example, the threshold is 90% of the CPU resources which are allocated to the VM.

This allows the control device 100 to calculate the predictive values of the data of the some metric systems by the JIT modeling, and to predict loads for the calculation resources of the data center based on the calculated predictive value. Accordingly, the control device 100 is able to control the calculation resources of the information processing device such that it is possible to efficiently reduce the power consumption of the data center while satisfying the SLA. In addition, the control device 100 may control the calculation resources of the information processing device such that a probability that the SLA is satisfied is large even though it is hard to efficiently reduce the power consumption.

Furthermore, the control device 100 may select the metric systems, which are used in the JIT modeling, among the plurality of metric systems, thereby reducing time which is taken for the JIT modeling. This allows the control device 100 to suppress control performed on the calculation resources from being not in time up to load variation timing for the calculation resources of the data center because time is taken for the JIT modeling. As a result, the control device 100 is able to reduce a possibility that a period, which does not satisfy the SLA, is generated.

In addition, even in a location, such as the data center, in which physical phenomena are complicated, the control device 100 is able to accurately calculate the predictive value of the data of any one of the metric systems of the predictive target by the JIT modeling. In addition, even in a case where the data of the some metric systems of the predictive target are specified in nonlinear manner, the control device 100 is able to accurately calculate the predictive values of the data of the some metric systems of the predictive target by the JIT modeling.

(Example of Information Processing System 200)

Subsequently, an example of an information processing system 200, to which the control device 100 illustrated in FIG. 1 is applied, will be described.

Figure 2:
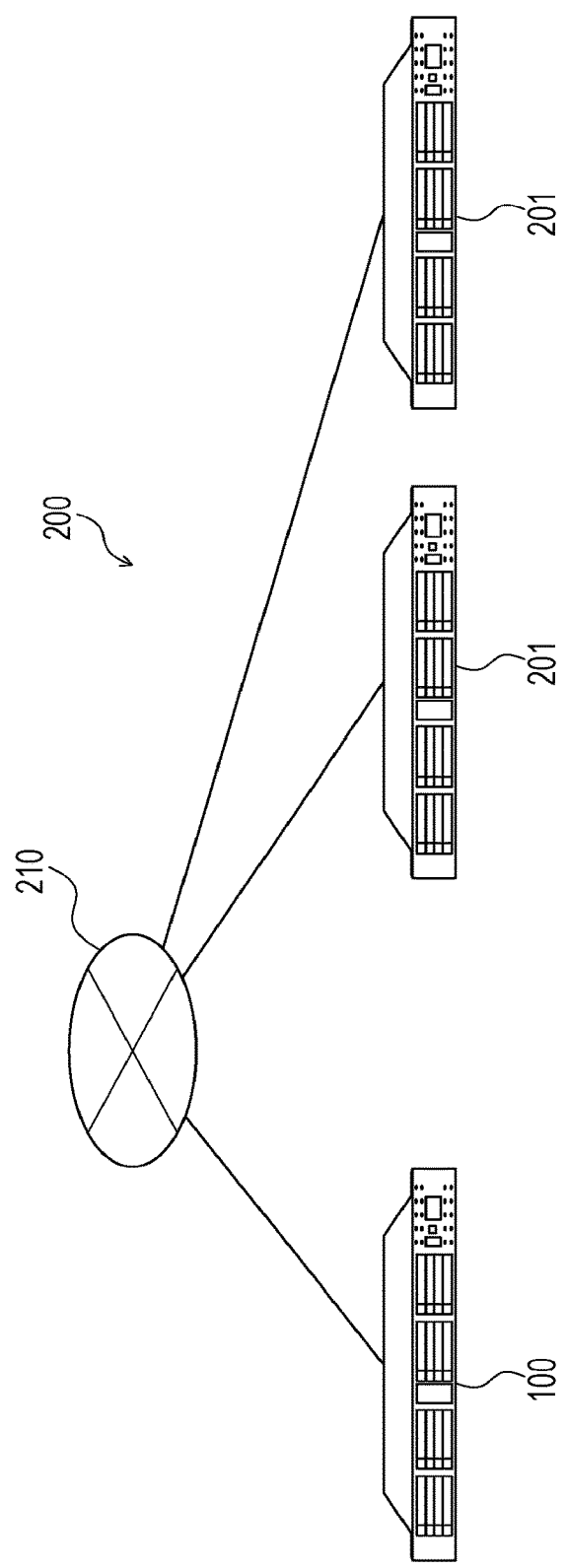
FIG. 2 is a diagram illustrating an example of an information processing system, according to an embodiment.

FIG. 2 is an explanatory diagram illustrating the example of the information processing system 200. In FIG. 2, the information processing system 200 includes the control device 100 and an information processing device 201. In the information processing system 200, the control device 100 is coupled to the information processing device 201 through a wired or wireless network 210. For example, examples of the network 210 includes a local area network (LAN), a wide area network (WAN), the Internet, and the like The control device 100 is a computer which manages the information processing device. For example, the control device 100 is a server. The control device 100 is a server which exists in the data center. The control device 100 may be a server which exists on the outside of the data center. The information processing device 201 is a computer which includes the calculation resources. The information processing device 201 is able to execute the VM. For example, the information processing device 201 executes the VM by using the host OS. For example, the information processing device 201 may execute the VM by using hypervisor. Specifically, the information processing device 201 is a server. The control device 100 may be integrated with any one of the information processing device 201.

(Example of Hardware Configuration of Control Device)

Subsequently, an example of a hardware configuration of the control device 100 will be described with reference to FIG. 3.

Figure 3:
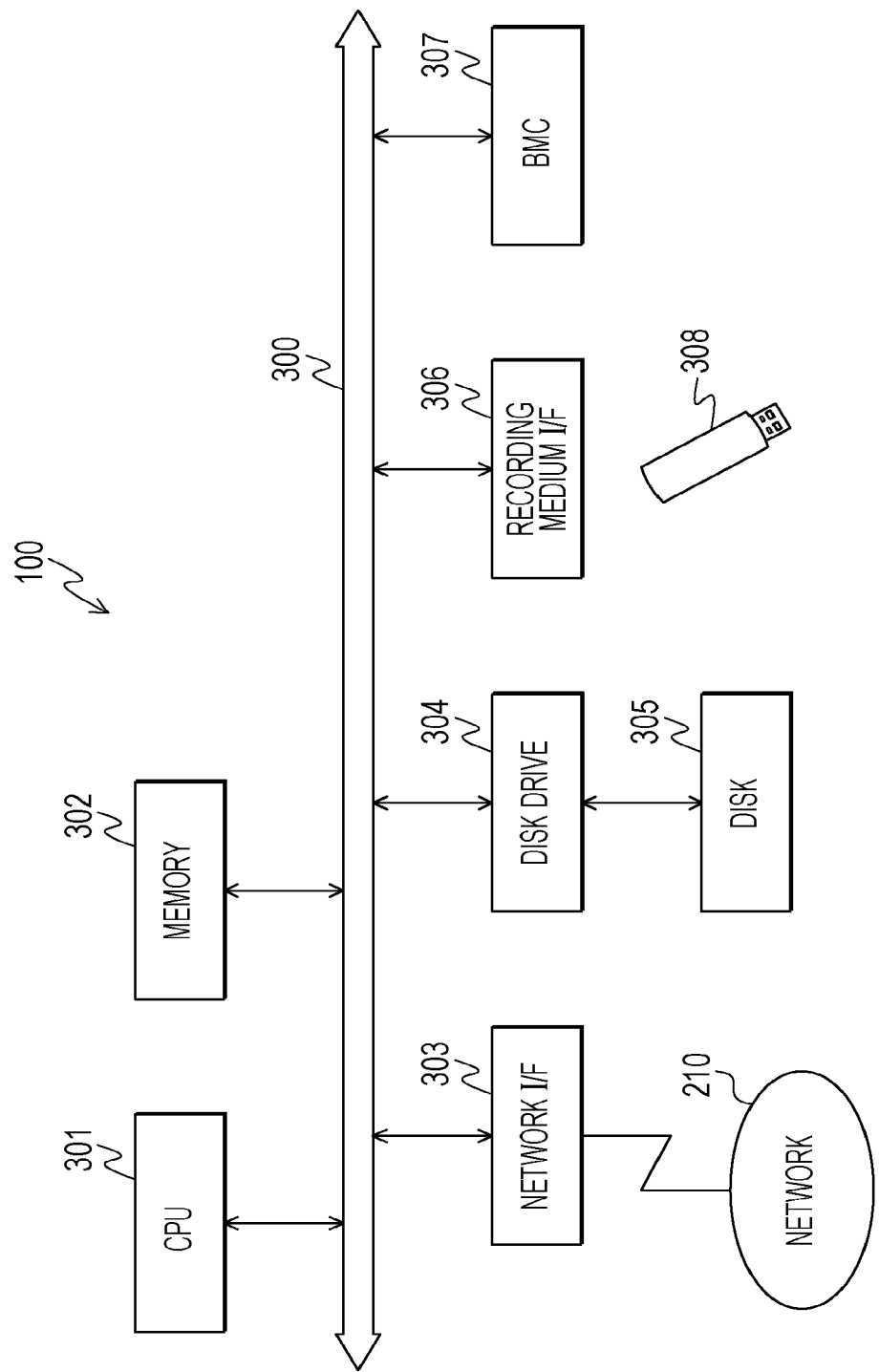
FIG. 3 is a diagram illustrating an example of a hardware configuration of a control device, according to an embodiment.

FIG. 3 is a block diagram illustrating the example of the hardware configuration of the control device 100. In FIG. 3, the control device 100 includes a CPU 301, a memory 302, a network interface (I/F) 303, a disk drive 304, a disk 305, a recording medium I/F 306, and a base management controller (BMC) 307. In addition, the respective configuration units are coupled to each other through a bus 300.

Here, the CPU 301 controls the whole of control device 100. For example, the memory 302 includes a read only memory (ROM), a random access memory (RAM), a flash ROM, and the like. For example, the flash ROM and the ROM store various programs, and RAM is used as a work area of the CPU 301. The program, which is stored in the memory 302, is loaded to the CPU 301, and the CPU 301 is caused to perform a coded process.

The network I/F 303 is coupled to the network 210 through a communication line, and is coupled to another computer (for example, a client device 202 illustrated in FIG. 2) through the network 210. Furthermore, the network I/F 303 functions as an internal interface with the network 210, and controls input/output of data from another computer. For example, it is possible to use a modem, a LAN adapter, and the like as the network I/F 303.

The disk drive 304 controls read/write of data with respect to the disk 305 according to control of the CPU 301. For example, the disk drive 304 includes a magnetic disk drive. The disk 305 is a nonvolatile memory which stores data written under the control of the disk drive 304. For example, the disk 305 includes a magnetic disk, an optical disk, and the like. The memory 302 or the disk 305 realizes a database (DB) 400 which stores the time-series data relevant to the plurality of respective metric systems as the reference data and which will be described later in FIG. 4.

The recording medium I/F 306 is coupled to an external recording medium 308, functions as an internal interface with the external recording medium 308, and controls input/output of data with respect to the external recording medium 308. For example, the recording medium I/F 306 includes a universal serial bus (USB) port. For example, the recording medium 308 includes a USB memory. The recording medium 308 may store a control program according to the embodiment. The BMC 307 monitors hardware and performs remote control on the hardware.

The control device 100 may include, for example, a solid state drive (SSD), a semiconductor memory, a keyboard, a mouse, a display, and the like, in addition to the above-described configuration units. In addition, the control device 100 may include an SSD, a semiconductor memory, and the like instead of the disk drive 304 and the disk 305. In addition, the control device 100 may not include the disk drive 304, the disk 305, and the recording medium I/F 306.

(Example of Data Structure of Time-Series Data relevant to Metric Systems)

Subsequently, an example of a data structure of the time-series data relevant to the metric systems, which are stored in the DB 400 as the reference data, will be described with reference to FIG. 4. For example, the DB 400 is realized by the memory 302 and the disk 305 of the control device 100 illustrated in FIG. 3.

FIG. 4 is an explanatory diagram illustrating an example of the data structure of the time-series data relevant to a metric system. As illustrated in FIG. 4, the time-series data relevant to the metric system includes fields 401 to 405 of a metric system name, data acquisition time, a physical host address, a virtual machine address, and a metric system data.

A name of the metric system is set to the metric system name field 401. In the example of FIG. 4, the name of the metric system is the amount of transmission/reception data. Time, in which data relevant to the metric system is acquired, is set to the data acquisition time field 402. An address of the physical host as information that specifies the physical host, is set to the physical host address field 403. A virtual machine address as information that specifies the virtual machine, is set to the virtual machine address field 404.

Data relevant to the metric system, which are acquired in time that are set to the data acquisition time field 402 and the name of which is set to the metric system name field 401, are set to the metric system data field 405. Data relevant to the metric system are set to the metric system data field 405 for each physical machine or each virtual machine executed by the physical machine.

(Example of Hardware Configuration of Information Processing Device 201)

Since an example of a hardware configuration of the information processing device 201 is the same as the example of the hardware configuration of the control device 100, the description thereof will not be repeated.

(Example of Functional Configuration of Control Device 100)

Subsequently, an example of a functional configuration of the control device 100 will be described with reference to FIG. 5.

Figure 5:
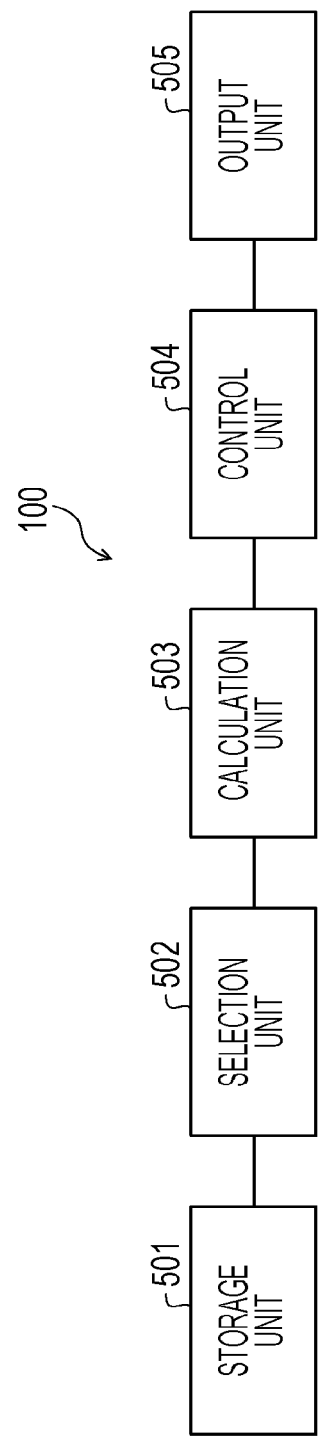
FIG. 5 is a diagram illustrating an example of a functional configuration of a control device, according to an embodiment.

FIG. 5 is a block diagram illustrating the example of the functional configuration of the control device 100. The control device 100 includes a storage unit 501, a selection unit 502, a calculation unit 503, a control unit 504, and an output unit 505.

The storage unit 501 is realized by, for example, a storage area, such as the memory 302 and the disk 305, illustrated in FIG. 3. For example, functions of the selection unit 502 to the output unit 505 are realized by causing the CPU 301 to execute a program which is stored in the storage area, such as the memory 302 and the disk 305, illustrated in FIG. 3, or by the network I/F 303. Results of processes performed by the respective functional units are stored in, for example, the storage area, such as the memory 302 and the disk 305, illustrated in FIG. 3.

The storage unit 501 stores plural pieces of reference data which are selected based on the operation data which is input from the host OS executed by the information processing device 201. The reference data is time-series data which includes performance values at a plurality of respective time points. The operation data is time-series data relevant to the performance values. The operation data is, for example, time-series data which is acquired based on the performance monitoring on the host OS executed by the information processing device 201 and relates to the performance values indicative of the state of the information processing device 201. The state of the information processing device 201 is related to performance of a VM which is executed by the information processing device 201 and is related to the load of the information processing device 201.

The reference data is time-series data which are selected from the operation data and are related to a prescribed metric system. In a case where there is a plurality of VMs in the data center, the reference data may include time-series data which are related to a prescribed metric system of each of the VMs. For example, the metric system includes a CPU use rate of a VM, a memory use rate, the number of DISK commands, a network transmission/reception speed, the number of DISK reading times, the number of DISK writing times, an average DISK queue latency, the amount of transmission/reception data, and the like.

The storage unit 501 stores, for example, the DB 400. The storage unit 501 is able to store the time-series data, which are used for the JIT modeling and are related to each of the metric systems of the plurality of metric systems, in the DB 400, and is able to cause the selection unit 502 to refer to the time-series data.

The selection unit 502 selects one or more pieces of selection reference data from the plural pieces of reference data, based on a plurality of correlation coefficients which are calculated based on the input predictive demand and which respectively indicate correlations between the predictive target reference data, which is the predictive target reference data, and other reference data.

The selection unit 502 sequentially selects a prescribed number of pieces of selection reference data, for example, in order in which the correlation coefficient is large. The selection unit 502 may select the selection reference data in which the correlation coefficient is equal to or larger than the prescribed threshold. This allows the selection unit 502 to reduce the number of pieces of time-series data relevant to the metric systems used for the JIT modeling, and to reduce time which is taken for the JIT modeling.

The calculation unit 503 calculates the predictive value of the predictive target reference data, based on one or more pieces of selection reference data which are selected by the selection unit 502. The calculation unit 503 prepares the local model by using the JIT modeling, and calculates the predictive value of the predictive target reference data.

For example, the calculation unit 503 specifies one or more performance values for respective pieces of selection reference data of one or more pieces of selection reference data at a time point before a prescribed time point at which L2 norm between one or more performance values at the prescribed time point is equal to or lower than a prescribed threshold. Furthermore, the calculation unit 503 calculates a statistic value of the predictive values of the predictive target reference data, based on the specified one or more performance values. The prescribed time point is, for example, the latest time point at which the performance value is acquired.

For example, the calculation unit 503 specifies the one or more performance values for respective pieces of selection reference data at a time point before the prescribed time point at which L2 norm between the one or more performance values at the prescribed time point is equal to or lower than the prescribed threshold. Furthermore, the calculation unit 503 calculates the statistic value of the predictive values of the predictive target reference data, based on the specified one or more performance values. This allows the calculation unit 503 to predict the load of the information processing device 201 in the data center.

The control unit 504 controls the calculation resources of the information processing device 201 via the output unit 505, based on the predictive value of the predictive target reference data calculated by the calculation unit 503 and the predetermined reference value. The reference value is a performance value which indicates a state relevant to a virtual machine of a predetermined information processing device. The reference value is, for example, the performance value which becomes reference of determination of whether or not performance of a virtual machine desired for the user is secured. Control performed on the calculation resources may be, for example, assignment of the calculation resources to the virtual machine. Control performed on the calculation resources may be change of power to be supplied to the calculation resources.

For example, in a case where the predictive value of the predictive target reference data calculated by the calculation unit 503 is the performance value which indicates that performance is lower than the reference value, the control unit 504 increases the calculation resources, which are allocated to the virtual machine, of the information processing device 201 via the output unit 505. For example, in a case where the predictive value of the CPU use rate of the VM is calculated, the control unit 504 uses 90% of the CPU resources allocated to the VM as the reference value. The control unit 504 changes the CPU resources which are allocated to the VM by outputting a control signal to the information processing device 201 via the output unit 505. This allows the control unit 504 to suppress the SLA from being not satisfied.

For example, in a case where the predictive value of the predictive target reference data calculated by the calculation unit 503 is the performance value which indicates that performance is higher than the reference value, the control unit 504 reduces the calculation resources, which are allocated to the virtual machine, of the information processing device 201. For example, in a case where the predictive value of the CPU use rate of the VM is calculated, the control unit 504 uses 50% of the CPU resources allocated to the VM as the reference value. The control unit 504 changes the CPU resources, which are allocated to the VM, by outputting a control signal to the information processing device 201 via the output unit 505. This allows the control unit 504 to reduce power consumption of the data center while satisfying the SLA.

In a case where there is no virtual machine to which the calculation resources of the information processing device 201 are allocated as a result of the control performed on the calculation resources of the information processing device 201, the control unit 504 stops supplying power to the information processing device 201. The control unit 504 stops supplying power to, for example, the information processing device 201 to which the VM is not allocated. The control unit 504 stops supplying power to the information processing device 201 by outputting the control signal to the information processing device 201 via the output unit 505. This allows the information processing device 201 to reduce power consumption.

The output unit 505 outputs the control signal to the information processing device 201 according to the control unit 504. Therefore, the output unit 505 is able to control the calculation resources of the information processing device 201, and is able to reduce poser power consumption of the data center while satisfying the SLA.

(Example of Detailed Configuration of Control Device 100)

Subsequently, an example of a detailed configuration of the control device 100 will be described with reference to FIG. 6.

Figure 6:
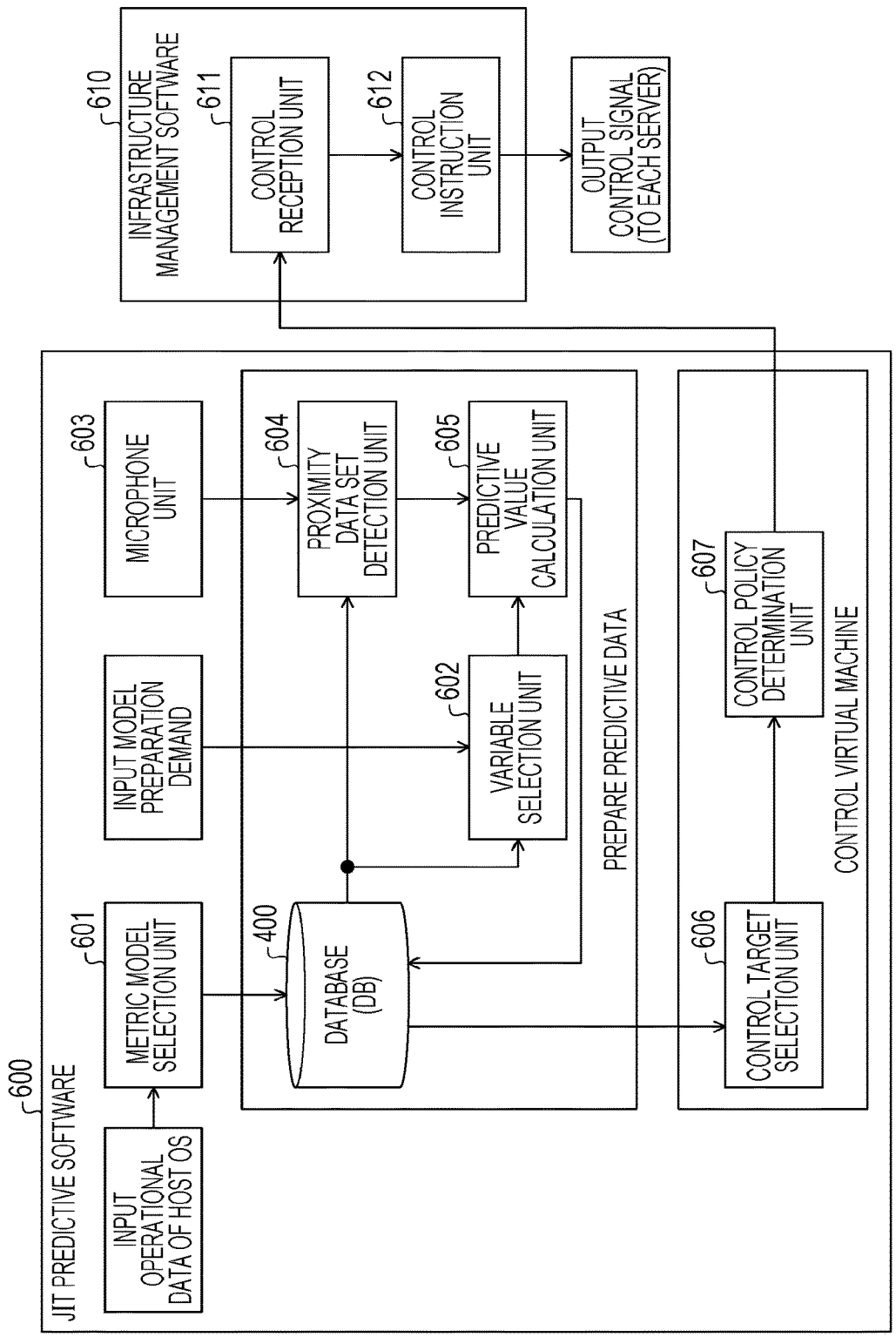
FIG. 6 is a diagram illustrating an example of a detailed configuration of a control device, according to an embodiment.

FIG. 6 is a block diagram illustrating the example of the detailed configuration of the control device 100. As illustrated in FIG. 6, the control device 100 manages a metric system selection unit 601, a variable selection unit 602, a timer unit 603, a proximity data set detection unit 604, and a predictive value calculation unit 605 by using JIT predictive software 600. In addition, the control device 100 manages a control target selection unit 606 and a control policy determination unit 607 by using the JIT predictive software 600. In addition, the control device 100 manages a control reception unit 611 and a control instruction unit 612 by using infrastructure management software 610.

The metric system selection unit 601 receives input of the operation data from the host OS of the information processing device 201. The metric system selection unit 601 selects time-series data, which are related to the respective metric systems of the plurality of metric systems, based on the received operation data, and stores the selected time-series data in the DB 400.

The variable selection unit 602 receives a model preparation demand. For example, the model preparation demand is a demand which designates a metric system of the predictive target, and is input at prescribed intervals. Specifically, the model preparation demand is automatically input in order to update a model relevant to the metric system of the predictive target at a timing in which the number of information processing devices 201 in the data center increases or reduces. The model preparation demand may be manually input. The model preparation demand may be input in order to update the model relevant to the metric system of the predictive target at predetermined time every day.

In a case where the model preparation demand is received, the variable selection unit 602 calculates a correlation coefficient between the metric system of the predictive target and other metric systems, and selects a metric system to be used for a model which is prepared through JIT modeling, based on the correlation coefficient. In addition, the variable selection unit 602 calculates a coefficient, which is used for a model to be prepared through the JIT modeling, using a stepwise method. This allows the variable selection unit 602 to improve accuracy for calculating the predictive value by regularly updating the model.

The timer unit 603 outputs the predictive demand to the proximity data set detection unit 604 every fixed time, and operates the proximity data set detection unit 604. The proximity data set detection unit 604 detects a proximity data set, in which the L2 norm between the latest data set and a past data set is lower than the prescribed threshold, among the past data sets. For example, the proximity data set detection unit 604 calculates L2 norm between the latest data set and each of the past data sets, and specifies the past data set, in which L2 norm is relatively small, as the proximity data set.

The predictive value calculation unit 605 calculates the predictive value related to the metric system of the predictive target by inputting the specified proximity data set to the prepared model. In a case where the predictive value calculation unit 605 calculates the predictive value, the predictive value calculation unit 605 stores the predictive value in the DB 400. This allows the predictive value calculation unit 605 to reduce the power consumption of the data center in such a way as to calculate a regularly predictive value and to control the calculation resources, which are allocated to the VM, by the control target selection unit 606 and the control policy determination unit 607.

The control target selection unit 606 selects a, control target VM, based on the predictive value which is stored in the DB 400. The control policy determination unit 607 determines a control policy with respect to the calculation resources which are allocated to the selected VM. For example, the control policy determination unit 607 determines the amount of CPU resources which are allocated to the selected VM or determines the information processing device 201 into which the selected VM moves. The control policy determination unit 607 outputs the selected VM and the determined control policy to the control reception unit 611. This allows the control target selection unit 606 and the control policy determination unit 607 to reduce the power consumption of the data center while satisfying the SLA.

The control reception unit 611 receives information on the control target VM and the control policy from the control policy determination unit 607, and outputs the information on the control target VM and the control policy to the control instruction unit 612. The control instruction unit 612 outputs the control signal according to the control policy with respect to the information processing device 201 which is executing the control target VM. This allows the control reception unit 611 and the control instruction unit 612 to control the information processing device 201.

Example of Operation of Control Device 100 According to Exemplary Example 1

Subsequently, an example of an operation of the control device 100 according to exemplary example 1 will be described with reference to FIGS. 7 to 11.

Figure 7:
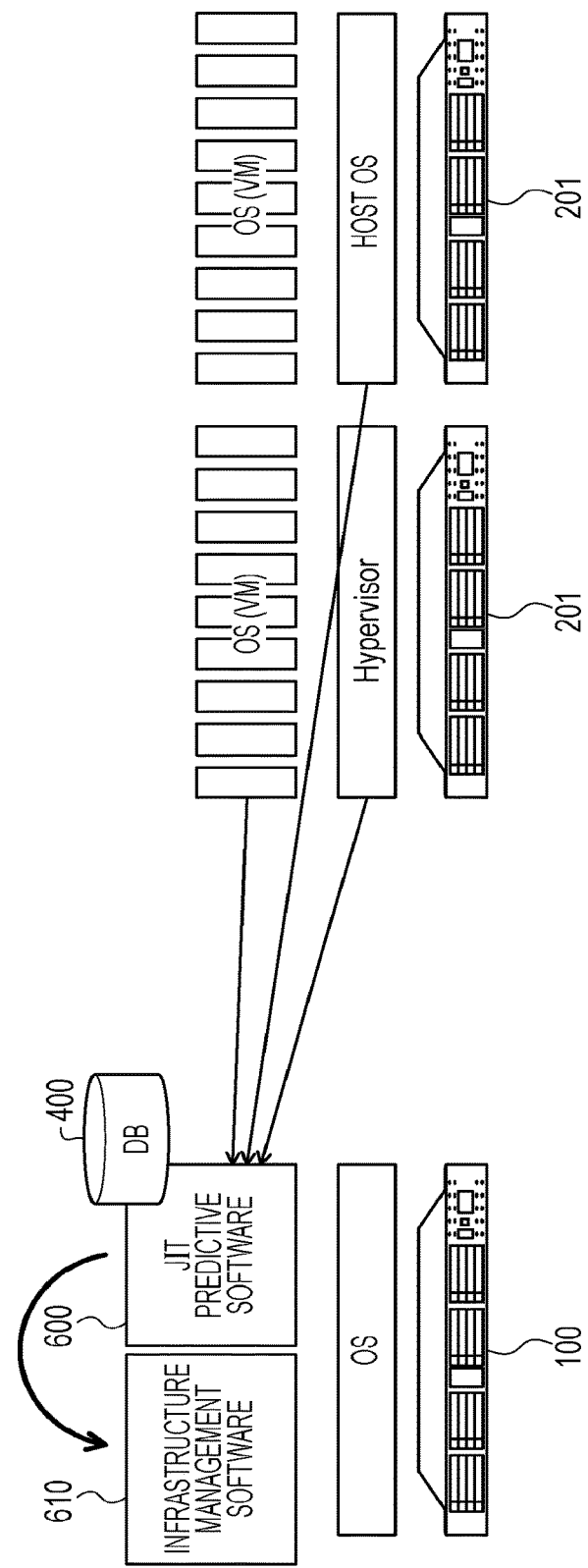
FIG. 7 is a diagram illustrating an example of an operation of a control device, according to an embodiment.

FIGS. 7 to 11 are explanatory diagrams illustrating an example of the operation of the control device according to the example 1. In FIG. 7, the control device 100 acquires the operation data from the information processing device 201 via the JIT predictive software 600 every fixed time, and stores the operation data in the DB 400. For example, the control device 100 acquires performance information, based on performance monitoring on the OS of the VM, and adds a record according to the acquired performance information to the reference data which is stored in the DB 400.

In addition, for example, the control device 100 may acquire hardware event information from hardware event management software on the host OS of the information processing device 201, and may add a record according to the acquired hardware event information to the reference data which is stored in the DB 400. In addition, for example, the control device 100 may acquire the hardware event information from a hypervisor API of the information processing device 201, and may add a record according to the acquired hardware event information to the reference data which is stored in the DB 400.

This allows the control device 100 to update time-series data which are relevant to the respective metric systems of the plurality of metric systems and are stored in the DB 400. As a result, the control device 100 is able to update the time-series data relevant to the metric systems, which are used for the JIT modeling, to a latest state. Subsequently, proceeding to description with reference to FIG. 8.

In FIG. 8, the control device 100 receives a predictive demand which designates the time-series data relevant to the CPU use rate as the predictive target reference data which is the predictive target. In a case where the predictive demand is received, the control device 100 calculates the correlation coefficient between the time-series data relevant to the CPU use rate and the time-series data relevant to other metric systems which are different from the CPU use rate. For example, the control device 100 calculates the correlation coefficient between the time-series data relevant to the CPU use rate and the time-series data relevant to the amount of transmission/reception data by using the following Equation (1).

$$\text{correlation coefficient between } CPU \text{ use rate and transmission/reception data amount} = \frac{CPU \text{ use rate standard deviation in certain time} * \text{transmission/reception data amount standard deviation in certain time}}{\text{total sum of } (CPU \text{ use rate in certain time} - CPU \text{ use rate standard deviation in certain time}) * (\text{transmission/reception data amount in certain time} - \text{transmission/reception data amount standard deviation in certain time})} \quad (1)$$

Specifically, the control device 100 calculates the correlation coefficient by substituting the CPU use rate, the amount of transmission/reception data, a CPU use rate standard deviation, and a standard deviation of the amount of transmission/reception data for the Equation (1) for each VM. Furthermore, the control device 100 calculates the statistic value of the correlation coefficient for each VM as the correlation coefficient between the time-series data relevant to the CPU use rate and the time-series data relevant to the amount of transmission/reception data.

The control device 100 may calculate the correlation coefficient between the time-series data relevant to the CPU use rate and the time-series data relevant to the amount of transmission/reception data by collectively handling the CPU use rates and the amount of transmission/reception data for the plurality of respective VMs without calculating the correlation coefficient for each VM. The control device 100 may select any one of the VMs as a representative of the plurality of VMs, and may use a correlation coefficient, which is calculated for the any one of VMs selected as the representative, as the correlation coefficient between the time-series data relevant to the CPU use rate and the time-series data relevant to the amount of transmission/reception data.

In addition, similarly, the control device 100 calculates the correlation coefficients between the time-series data relevant to the CPU use rate and the time-series data relevant to other metric systems, such as the memory use rate and the number of DISK commands, which are different from the CPU use rate and the amount of transmission/reception data. This allows the control device 100 to acquire an index value indicative of a degree of preference of the use of the respective metric systems of other metric systems, which are different from the CPU use rate and for which the calculated correlation coefficients are large, in the case of obtaining the predictive value of the CPU use rate. Subsequently, proceeding to description with reference to FIG. 9.

In FIG. 9, the control device 100 sorts the plurality of metric systems in order in which the calculated correlation coefficient is large. The control device 100 sets metric systems up to 10-th ranking among the plurality of sorted metric systems as metric systems which are to be used for the JIT modeling to obtain the predictive value of the CPU use rate. This allows the control device 100 to reduce time to be taken for the JIT modeling while suppressing accuracy of the JIT modeling from being lowered. Subsequently, proceeding to description with reference to FIG. 10.

In FIG. 10, the control device 100 detects a proximity data set, which is a set of the performance values at the past time point at which the L2 norm to the latest data set that is a set of the performance values at the latest time point is equal to or lower than the prescribed threshold, in the time-series data relevant to the selected respective metric systems. For example, the control device 100 calculates the L2 norm between the latest data set and the past data set which is a set of the performance values at the respective past time points by using the following Equation (2).

$$D_t(k_t, k_q) = \sqrt{(x^{k_t} - x^{k_q})^T (k^{k_t} - x^{k_q})} \quad (2)$$

Here, t indicates the past time point. $k_t$ is a past data set corresponding to the past time point t. $k_q$ is the latest data set. $D_t(k_t, k_q)$ is the L2 norm between the latest data set and the past data set corresponding to the past time point t.

Furthermore, the control device 100 specifies ten past data sets from a side on which the calculated L2 norm is small, as the proximity data set among the past data sets. The control device 100 may specify the past data sets, in which the calculated L2 norm is equal to or smaller than the prescribed threshold, as the proximity data set among the past data sets.

Subsequently, the control device 100 calculates the predictive value of the CPU use rate for each specified proximity data set by using the following Equation (3). For example, the control device 100 calculates the predictive value of the CPU use rate by using a j-th proximity data set among n proximity data sets.

$$\hat{y}_j^{k_q} = \beta_0 \sum_{i=1}^{m} \beta_i x_i^{k_t} \quad (3)$$

Here, $y_j^{k_q}$ is the predictive value of the CPU use rate based on the j-th proximity data set. $\beta_0$ is a coefficient. $\beta_i$ is a coefficient. For example, $\beta_0$ and $\beta_i$ are obtained using the stepwise method, based on the time-series data relevant to the amount of transmission/reception data. $x_i^{k_t}$ is a i-th performance value of the j-th proximity data set.

Subsequently, the control device 100 calculates the statistic value of the calculated predictive values of the CPU use rate by using the following Equation (4). For example, the control device 100 calculates an average value as the statistic value. The control device 100 may calculate a central value or a percentile as the statistic value.

$$\hat{y}^{k_q} = \sum_{j=1}^{n} \frac{\hat{y}_j^{k_q}}{n} \quad (4)$$

Here, $y^{k_q}$ is the statistic value of the predictive values of the CPU use rate. This allows the control device 100 to calculate the predictive value of the CPU use rate of the VM by using the JIT modeling, and to predict the load of the information processing device 201 in the data center. Furthermore, the control device 100 is able to reduce time which is taken for the JIT modeling, and is able to obtain the predictive value of the CPU use rate of the VM at the prescribed time point before the prescribed time point. Subsequently, proceeding to description with reference to FIG. 11.

Figure 11:
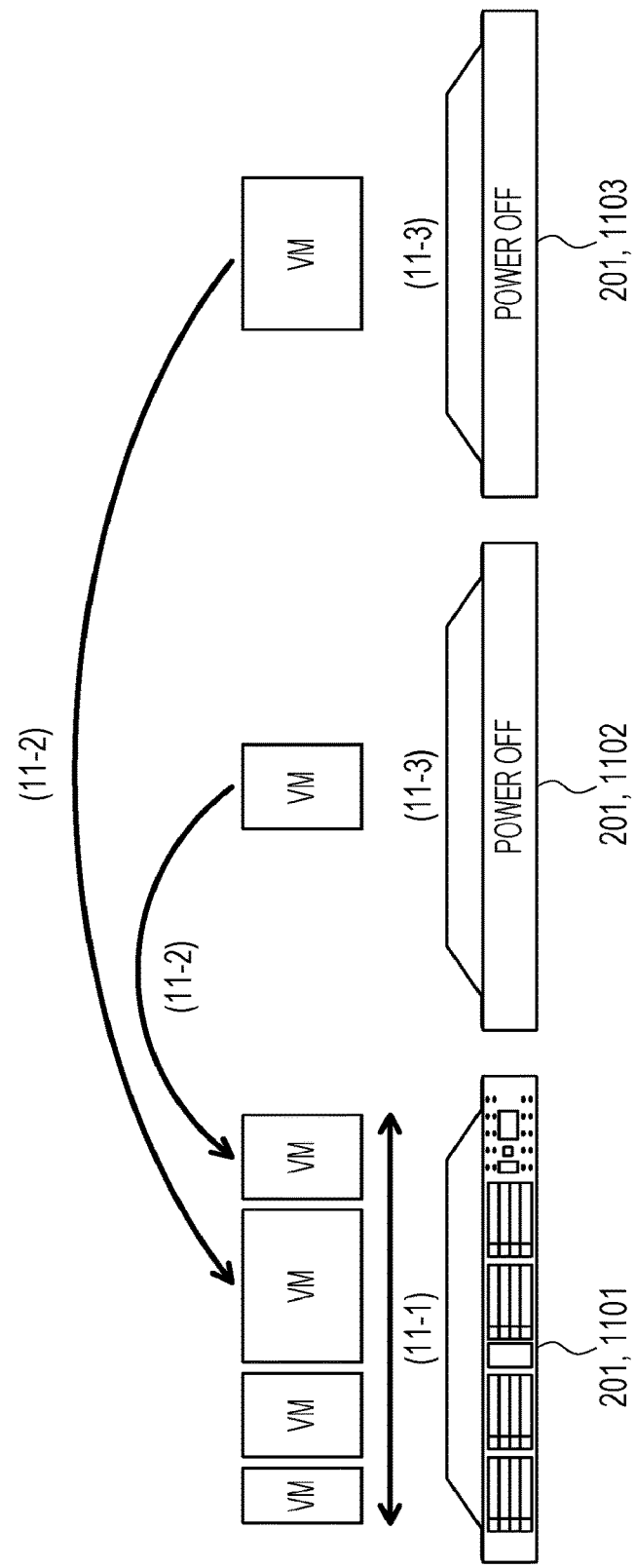
FIG. 11 is a diagram illustrating an example of an operation of a control device, according to an embodiment.

In FIG. 11, the control device 100 controls the calculation resources of the information processing device 201, based on the calculated predictive value of the CPU use rate. An example of the calculation resources is the CPU resource. The control is performed to change assignment of the calculation resources to be provided to the VM which is executed by the information processing device 201. The control may be performed to change power to be supplied to the calculation resources of the information processing device 201.

(11-1) For example, the control device 100 increases or reduces assignment of the CPU resources of the information processing device 201 for the VM which is executed by the information processing device 201. Specifically, in a case where the predictive value of the CPU use rate of the VM exceeds 90% of the CPU resources allocated to the VM, the control device 100 increases the CPU resources which are allocated to the VM.

In other words, in a case where the CPU use rate of the VM exceeds 100% of the CPU resources allocated to the VM and there is a relatively high possibility that the performance of the VM is lowered, the control device 100 is able to increase the CPU resources which are allocated to the VM. Therefore, the control device 100 is able to reduce the possibility that a period in which the SLA is not satisfied is generated.

In addition, for example, in a case where the predictive value of the CPU use rate of the VM is lower than 50% of the CPU resources allocated to the VM, the control device 100 reduces the CPU resources which are allocated to the VM while satisfying the SLA.

In other words, in a case where the CPU use rate of the VM is lower than 50% of the CPU resources allocated to the VM and power consumption for the CPU resources which are not used by the VM is relatively large, the control device 100 is able to reduce the CPU resources which are allocated to the VM. This allows the control device 100 to efficiently reduce the power consumption of the data center while satisfying the SLA.

(11-2) For example, the control device 100 move the VM, which is executed by the information processing device 201, to another information processing device 201 in order to execute the VM by another information processing device 201. Specifically, there is a case where the CPU resources of another information processing device 201 are large compared to the total value of the predictive values of the CPU use rates of the VM which is executed by another information processing device 201 and thus another information processing device 201 is further in a state in which it is possible to execute the VM.

In this case, furthermore, the control device 100 moves the VM, which is executed by the information processing device 201, to another information processing device 201 which is in a state capable of executing the VM. This allows the control device 100 to reduce the number of information processing devices 201 which are executing the VM in the data center.

(11-3) For example, in a case where there exist no VMs which are to be executed by the information processing device 201 as a result that the VM, which is executed by the information processing device 201, is moved to another information processing device 201, the control device 100 stops supplying power to the information processing device 201. This allows the control device 100 to efficiently reduce the power consumption of the data center.

As described above, it is unnecessary for the control device 100 to activate the information processing device 201 in the hot stand-by state in preparation for the change in the load of the information processing device 201. For example, the control device 100 is able to stop to supply power to information processing devices 1102 and 1103 among information processing devices 1101 to 1103.

Here, for example, in a case where the information processing device 201 is being activated in the hot stand-by state even though the CPU use rate is 0%, there is a case where approximately 130 W is used as power consumption. In contrast, in a state in which the power is stopped being supplied, there is a case where the information processing device 201 may use approximately 10 W as power consumption. In addition, in a case where the information processing device 201 is being activated and the CPU use rate is 100%, there is a case where the information processing device 201 uses approximately 280 W as power consumption.

Therefore, the control device 100 is able to reduce power consumption of the data center, compared to a case where the load of the information processing device 201 in the data center is not predicted and the information processing device 201 is activated in the hot stand-by state in preparation for the change in the load of the information processing device 201. For example, the control device 100 is able to reduce approximately 45% of the power consumption of the data center, compared to a case where the information processing devices 1102 and 1103 are activated in the hot stand-by state among information processing devices 1101 to 1103.

Furthermore, the control device 100 is able to reduce a possibility that a period in which the SLA is not satisfied is generated even in a case where the power consumption is reduced. For example, the control device 100 is able to cause difference between an actually measured value and the approximately 98% of the predictive values of the CPU use rate to be lower than ±10%, by using the JIT modeling. Furthermore, for example, the control device 100 is able to cause difference between the actually measured value and the approximately 2% of the predictive values of the CPU use rate to be lower than ±20%.

Here, as described above, in a case where the predictive value of the CPU use rate of the VM exceeds 90% of the CPU resources allocated to the VM, the control device 100 increases the CPU resources which are allocated to the VM. This allows the control device 100 to suppress a possibility that the CPU use rate of the VM exceeds 100% of the CPU resources allocated to the VM and the performance of the VM is lowered, to approximately 2%.

In addition, in a case where the predictive value of the CPU use rate of the VM exceeds 80% of the CPU resources allocated to the VM, the control device 100 may increase the CPU resources which are allocated to the VM. Therefore, the control device 100 is able to further reduce the possibility that the CPU use rate of the VM exceeds 100% of the CPU resources allocated to the VM and the performance of the VM is lowered.

Furthermore, the control device 100 is able to limit the metric systems, which are used for the JIT modeling in order to obtain the predictive value of the CPU use rate, among the plurality of metric systems, thereby reducing time to be taken for the JIT modeling while suppressing the accuracy of the JIT modeling from being lowered.

For example, there is a case where 200 metric systems and a past data set corresponding to 24 hours exist. In this case, if the 200 metric systems are used for the JIT modeling, calculation is performed using the stepwise method for 200×144=28800, and there is a tendency that 3 or 4 hours are taken. In contrast, since the control device 100 selects 10 metric systems among the 200 metric systems, calculation is performed using the stepwise method for 10×144=1440, and thus 9 to 12 minutes may be taken. Here, since time which is taken to select the 10 metric systems among the 200 metric systems is short compared to time which is taken for calculation using the stepwise method, it is assumed that the time is 0 minute.

As a result, the control device 100 is able to reduce time taken for the JIT modeling compared to the case where the 200 metric systems are used for the JIT modeling. Furthermore, the control device 100 is able to suppress calculation resource control from being not in time without ending the JIT modeling until the time point of the predictive value, and is able to reduce the possibility that a period in which the SLA is not satisfied is generated.

Another Example of Reference Data According to Exemplary Example 1

Subsequently, another example of the reference data stored in the information processing device 201 according to the example 1 will be described with reference to FIG. 12.

FIG. 12 is an explanatory diagram illustrating another example of the reference data according to the example 1. In FIG. 12, a time interval at which the control device 100 acquires the CPU use rate of the VM may be different from a time interval at which the control device 100 acquires the amount of transmission/reception data. In the example of FIG. 12, the CPU use rate is acquired every 10 minutes. In contrast, the amount of transmission/reception data is acquired every one minute.

Example of Predictive Process Procedure According to Exemplary Example 1

Subsequently, an example of a predictive process procedure according to the example 1 will be described with reference to FIG. 13.

Figure 13:
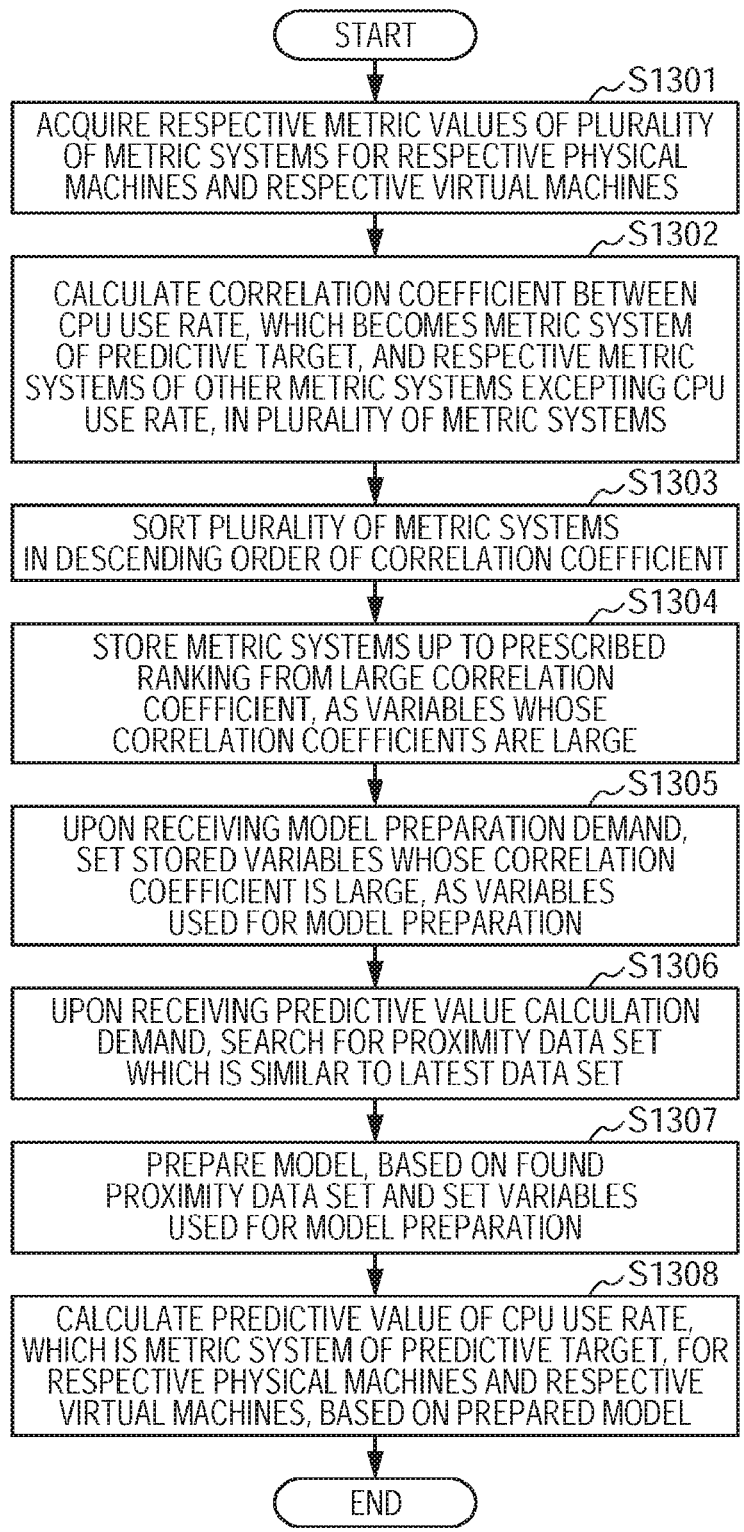
FIG. 13 is a diagram illustrating an example of an operational flowchart for a predictive process procedure, according to an embodiment.

FIG. 13 is a flowchart illustrating an example of the predictive process procedure according to the example 1. In FIG. 13, the control device 100 acquires respective metric values of the plurality of metric systems for the respective physical machines and the respective virtual machines (step S1301).

Subsequently, the control device 100 calculates a correlation coefficient between the CPU use rate, which is the metric system of the predictive target, and each of the metric systems of other metric systems excepting the CPU use rate, which is the metric system of the predictive target, among the plurality of metric systems (step S1302). Furthermore, the control device 100 sorts the plurality of metric systems in descending order of correlation coefficient (step S1303).

Subsequently, the control device 100 stores the metric systems up to a prescribed ranking from a larger correlation coefficient as variables whose correlation coefficient are large (step S1304). Furthermore, when the model preparation demand is received, the control device 100 sets the stored variables whose correlation coefficient is large, as variables used for model preparation (step S1305).

Subsequently, when the predictive value calculation demand is received, the control device 100 search for a proximity data set whose L2 norm to the latest data set is equal to or smaller than the prescribed threshold (step S1306). Then, the control device 100 prepares a model, based on the found proximity data set and the variable used for the set model preparation (step S1307).

Subsequently, the control device 100 calculates a predictive value of the CPU use rate, which is the metric system of the predictive target, for each of the physical machines and each of the virtual machines, based on the prepared model (step S1308). Furthermore, the control device 100 ends the predictive process. This allows the control device 100 to calculate the predictive value of the CPU use rate of the VM by using the JIT modeling, and to predict the load of the information processing device 201 in the data center.

Example of Control Process Procedure According to Exemplary Example 1

Subsequently, an example of a control process procedure according to the example 1 will be described with reference to FIGS. 14 and 15.

Figure 14:
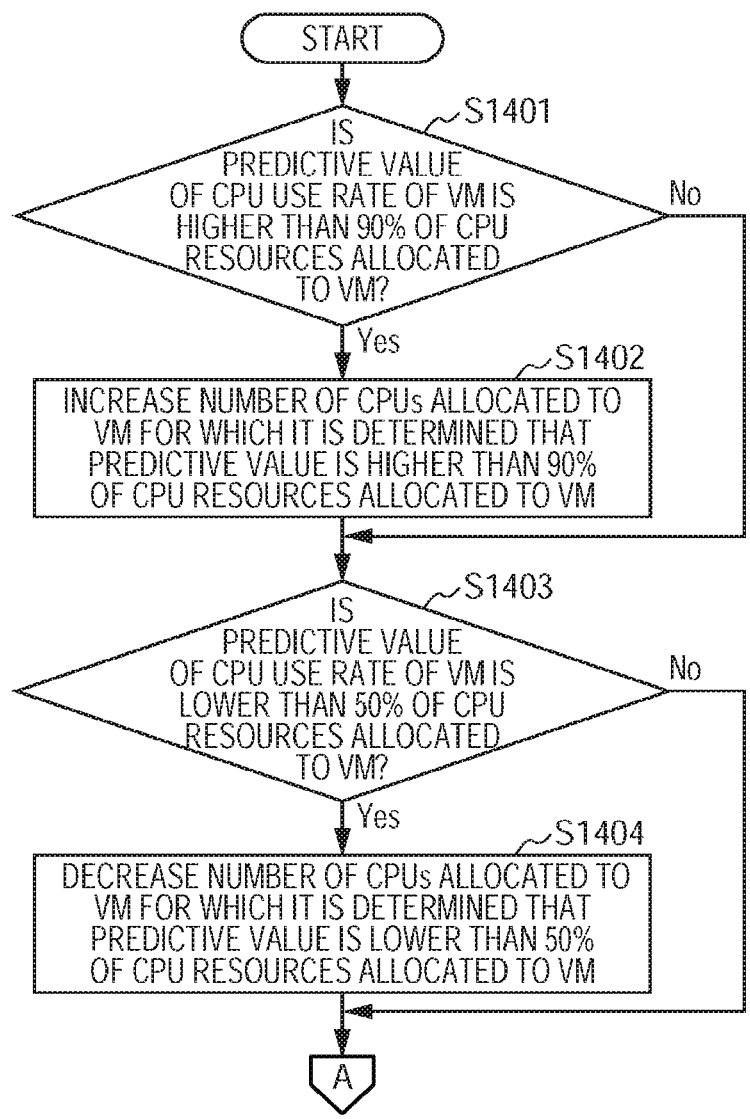
FIG. 14 is a diagram illustrating an example of an operational flowchart for a predictive process procedure, according to an embodiment.
Figure 15:
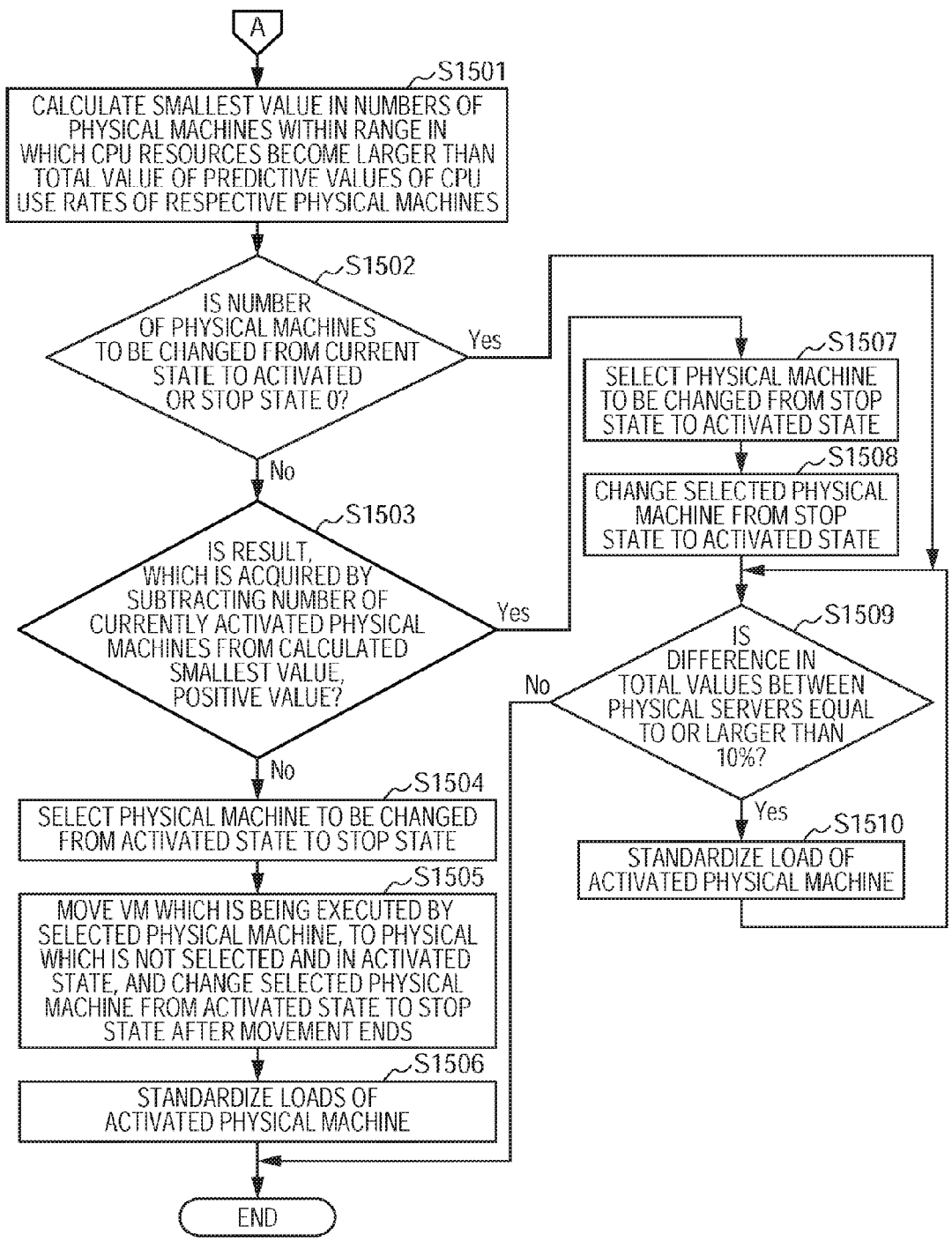
FIG. 15 is a diagram illustrating an example of an operational flowchart for a predictive process procedure, according to an embodiment.

FIGS. 14 and 15 are flowcharts illustrating the example of the control process procedure according to the example 1. In FIG. 14, the control device 100 determines whether or not the predictive value of the CPU use rate of the VM exceeds 90% of the CPU resources allocated to the VM (step S1401). Here, when the predictive value of the CPU use rate of the VM does not exceed 90% of the CPU resources (step S1401: No), the control device 100 proceeds to a process in step S1403.

In contrast, when the predictive value of the CPU use rate of the VM exceeds 90% of the CPU resources (step S1401: Yes), the control device 100 increases the number of CPUs allocated to the VM for which it is determined that the predictive value exceeds 90% of the CPU resources allocated to the VM (step S1402). For example, the control device 100 increases the number of CPUs allocated to the VM, for which it determined that the predictive value exceeds 90% of the CPU resources, up to the smallest value among the numbers of CPUs included in a range in which the CPU resources allocated to the VM is larger than the predictive value of the CPU use rate.

Subsequently, the control device 100 determines whether or not the predictive value of the CPU use rate of the VM is lower than 50% of the CPU resources allocated to the VM (step S1403). Here, when the predictive value of the CPU use rate of the VM is not lower than 50% of the CPU resources (step S1403: No), the control device 100 proceeds to a process in step S1501 of FIG. 15.

In contrast, when the predictive value of the CPU use rate of the VM is lower than 50% of the CPU resources (step S1403: Yes), the control device 100 reduces the number of CPUs allocated to the VM for which it is determined that the predictive value is lower than 50% of the CPU resources (step S1404). For example, the control device 100 increases the number of CPUs allocated to the VM, for which it determined that the predictive value is lower than 50% of the CPU resources, up to the smallest value among the numbers of CPUs included in a range in which the CPU resources allocated to the VM is larger than the predictive value of the CPU use rate. Furthermore, the control device 100 proceeds to a process in step S1501 of FIG. 15.

In FIG. 15, the control device 100 calculates a total value of the predictive values of the CPU use rates of the respective physical machines, and calculates the smallest number among the numbers of physical machines within a range in which the CPU resources are larger than the calculated total value (step S1501).

Furthermore, the control device 100 subtracts the number of physical machines, which are currently activated, from the calculated smallest value, calculates the number of physical machines to be changed from a current state to an activated or stop state, and determines whether or not the calculated number of physical machines is 0 (step S1502).

When a result of the subtraction is a positive value, an absolute value of the result of subtraction becomes a value indicative of the number of physical machines which are currently in a stop state and are to be changed from the stop state to an activated state. When the result of subtraction is a negative value, the absolute value of the result of subtraction becomes a value indicative of the number of physical machines which are currently in the activated state and are to be changed from the activated state to the stop state. Here, when the absolute value of the result of subtraction is 0 (step S1502: Yes), the control device 100 proceeds to a process in step S1509.

In contrast, when the absolute value of the result of subtraction is not 0 (step S1502: No), the control device 100 determines whether or not a result acquired by subtracting the number of physical machines, which are currently activated, from the calculated smallest value is a positive value (step S1503). Here, when the result of subtraction is the negative value and there is a physical machine which is to be changed from the activated state to the stop state among the physical machines which are activated (step S1503: No), the control device 100 proceeds to a process in step S1504.

In step S1504, the control device 100 selects a physical machine to be changed from the activated state to the stop state, among the physical machines which are activated (step S1504). For example, the control device 100 sequentially selects a physical machine for which the number of VMs being executed is smaller, in accordance with the calculated number of physical machines.

Subsequently, the control device 100 moves the VMs, which are being executed by the selected physical machine, to a physical machine which is not selected and in an activated state, and changes the selected physical machine from the activated state to the stop state after movement ends (step S1505).

Subsequently, the control device 100 standardizes the loads of the physical machines which are activated (step S1506). For example, the control device 100 sequentially moves a VM, for which the amount of change from the current CPU use rate to the predictive value is smaller among the VMs which are being executed by the activated physical machines, between physical machines, and standardizes the loads of the physical machines which are being activated. Furthermore, the control device 100 ends the control process.

In contrast, when the result of subtraction is the positive value and there is a physical machine which is changed from the stop state to the activated state among the physical machines which are being activated (step S1503: Yes), the control device 100 proceeds to a process in step S1507.

In step S1507, the control device 100 selects a physical machine to be changed from the stop state to the activated state among the physical machines which are being stopped (step S1507). Subsequently, the control device 100 changes the selected physical machine from the stop state to the activated state (step S1508).

Furthermore, the control device 100 compares the total values of the CPU use rates of the respective physical servers, and determines whether or not difference in the total values between the physical servers is equal to or higher than 10% (step S1509). Here, when the difference is equal to or higher than 10% (step S1509: Yes), the control device 100 standardizes the loads of the physical machines which are being activated (step S1510). For example, the control device 100 standardizes the loads of the physical machines, which are being activated, by sequentially moving a VM, for which the amount of change from the current CPU use rate to the predictive value is smaller among the VMs which are being executed by the activated physical machines, between the physical machines.

In contrast, when the difference is lower than 10% (step S1509: No), the control device 100 ends the control process. Therefore, the control device 100 is able to efficiently reduce the power consumption of the data center while satisfying the SLA.

Example of Operation of Control Device 100 According to Example 2

Subsequently, an example of an operation of a control device 100 according to exemplary example 2 will be described with reference to FIGS. 16 and 17.

FIGS. 16 and 17 are explanatory diagrams illustrating the example of the operation of the control device 100 according to the example 2. Similarly to FIG. 7, the control device 100 acquires operation data from the information processing device 201 every fixed time by using the JIT predictive software 600, and stores the operation data in the DB 400.

In FIG. 16, the control device 100 receives a predictive demand which designates time-series data relevant to latency as the predictive target reference data which is the predictive target. When the predictive demand is received, the control device 100 calculates a correlation coefficient between time-series data relevant to latency and time-series data relevant to other metric systems which are different from the latency. For example, the control device 100 substitutes the CPU use rate of the Equation (1) for latency, and calculates the correlation coefficient between the time-series data relevant to latency and the time-series data relevant to the amount of transmission/reception data.

The control device 100 sorts the plurality of metric systems in order in which the calculated correlation coefficient is large. The control device 100 sets metric systems included in tenth in ranking as metric systems, which are used for the JIT modeling in order to acquire a predictive value of latency, among the plurality of sorted metric systems. This allows the control device 100 to reduce time to be taken for the JIT modeling while suppressing the accuracy of the JIT modeling from being lowered. Subsequently, proceeding to description with reference to FIG. 17.

In FIG. 17, the control device 100 searches the time-series data relevant to the selected respective metric systems for a proximity data set which is a set of performance values of the past time point at which L2 norm to the latest data set that is a set of the performance values of the latest time points is equal to or smaller than the prescribed threshold. For example, the control device 100 calculates L2 norm between the latest data set and the past data set, which is a set of the performance values at respective past time points, by using Equation (2).

Furthermore, the control device 100 specifies ten past data sets from a side, on which the calculated L2 norm is small, as the proximity data set among the past data sets. The control device 100 may specify the past data sets, in which the calculated L2 norm is equal to or smaller than the prescribed threshold, as the proximity data set among the past data sets.

Subsequently, the control device 100 calculates the predictive value of the latency for each specified proximity data set by substituting the latency for the CPU use rate of Equation (3). For example, the control device 100 calculates the predictive value of the latency by using a j-th proximity data set among n proximity data sets.

Subsequently, the control device 100 calculates the statistic value of the predictive values of the latency calculated by substituting the latency for the CPU use rate of Equation (4). For example, the control device 100 calculates an average value as the statistic value. The control device 100 may calculate a central value or a percentile as the statistic value.

Thereafter, similarly to FIG. 11, the control device 100 controls the calculation resources of the information processing device 201, based on the calculated predictive value of the latency. An example of the calculation resources is the CPU resource. The control is performed to change allocation of the calculation resource to be provided to the VM which is executed by the information processing device 201. The control may be performed to change power to be supplied to the calculation resources of the information processing device 201.

In the example of FIG. 17, for example, in a case where it is demanded that the latency is lower than 0.5 msec as the SLA, the control device 100 increases the CPU resources which are allocated to the VM when the predictive value of the latency exceeds 0.45 msec. In other words, when there is relatively high possibility that the latency does not satisfy the SLA, the control device 100 is able to increase the CPU resources which are allocated to the VM. This allows the control device 100 to reduce the possibility that a period which does not satisfy the SLA is generated.

In addition, for example, in a case where the predictive value of the latency is lower than 0.25 msec, the control device 100 may reduce the CPU resources which are allocated to the VM while satisfying the SLA. In other words, when there is a relatively small possibility that the latency does not satisfy the SLA, the control device 100 is able to reduce the CPU resources which are allocated to the VM. This allows the control device 100 to efficiently reduce the power consumption of the data center while satisfying the SLA.

As described above, the control device 100 is able to reduce the power consumption of the data center. Furthermore, the control device 100 is able to reduce a possibility that a period in which the SLA is not satisfied is generated even though the power consumption is reduced. For example, the control device 100 is able to cause difference between an actually measured value and the approximately 98% of the predictive values of the latency to be lower than ±10% by using the JIT modeling. Furthermore, for example, the control device 100 is able to cause difference between the actually measured value and the approximately 2% of the predictive values of the latency to be lower than ±20%.

Here, as described above, in a case where the predictive value of the latency exceeds 0.45 msec, the control device 100 increases the CPU resources which are allocated to the VM. This allows the control device 100 to suppress a possibility that the latency exceeds 0.5 msec to approximately 2%. In addition, when the predictive value of the latency exceeds 0.40 msec, the control device 100 may increase the CPU resources which are allocated to the VM. This allows the control device 100 to further reduce the possibility that the latency exceeds 0.5 msec.

Example of Predictive Process Procedure According to Exemplary Example 2

Subsequently, an example of a predictive process procedure according to exemplary example 2 will be described with reference to FIG. 18.

Figure 18:
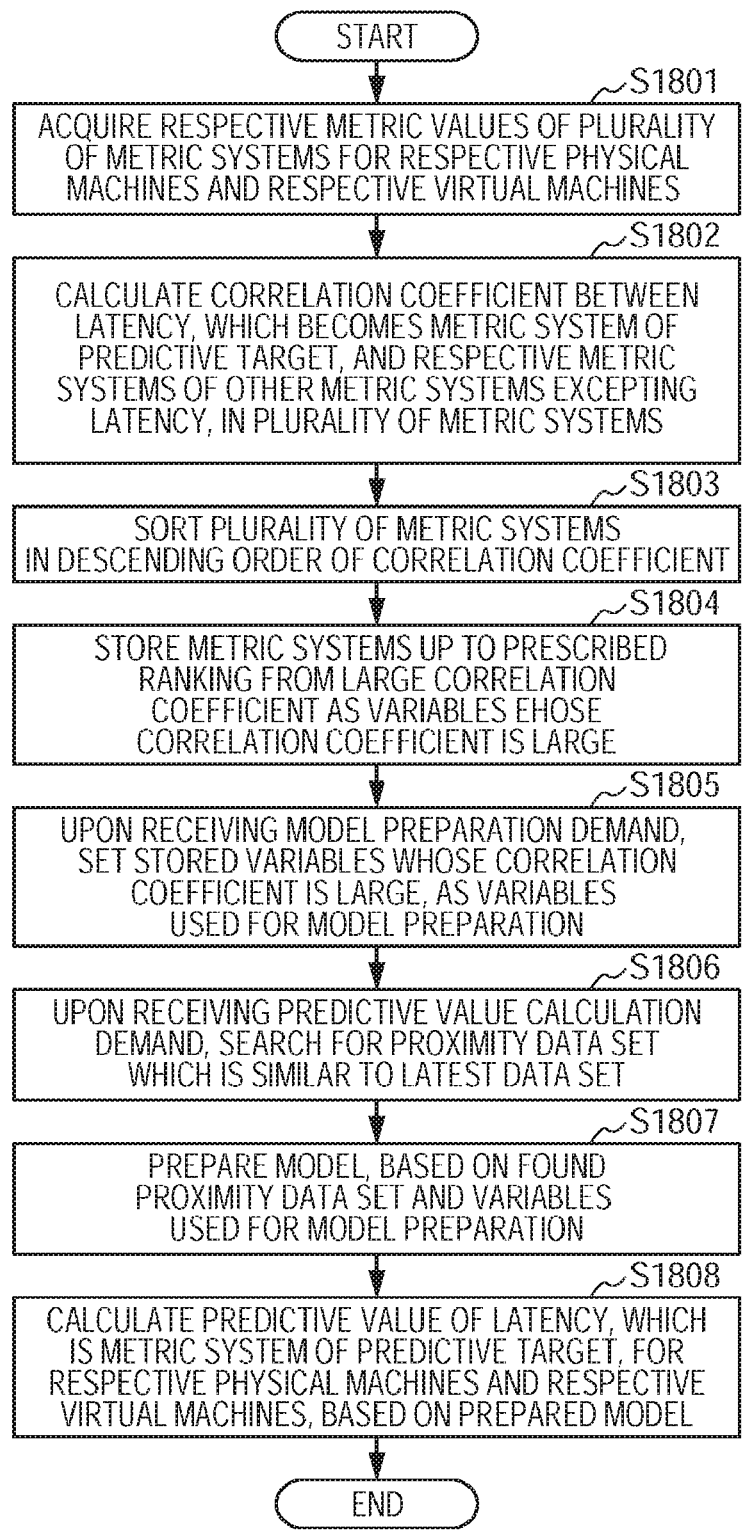
FIG. 18 is a diagram illustrating an example of an operational flowchart for a predictive process procedure, according to an embodiment.

FIG. 18 is a flowchart illustrating the example of the predictive process procedure according to the example 2. In FIG. 18, the control device 100 acquires the respective metric values of the plurality of metric systems for the respective physical machines and the respective virtual machines (step S1801).

Subsequently, the control device 100 calculates a correlation coefficient between the latency, which is the metric system of the predictive target, and each of the metric systems of other metric systems excepting the latency which is the metric system of the predictive target among the plurality of metric systems (step S1802). Furthermore, the control device 100 sorts the plurality of metric systems in descending order of correlation coefficient (step S1803).

Subsequently, the control device 100 stores the metric systems up to a prescribed ranking from a large correlation coefficient as variables whose correlation coefficient is larger (step S1804). Furthermore, when the model preparation demand is received, the control device 100 sets the stored variables whose correlation coefficient is large, as variables used for model preparation (step S1805).

Subsequently, when the predictive value calculation demand is received, the control device 100 searches for a proximity data set whose L2 norm to the latest data set is equal to or smaller than the prescribed threshold (step S1806). Furthermore, the control device 100 prepares a model, based on the found proximity data set and the variable used for the set model preparation (step S1807).

Subsequently the control device 100 calculates a predictive value of the latency, which is the metric system of the predictive target, for each of the physical machines and each of the virtual machines, based on the prepared model (step S1808). Furthermore, the control device 100 ends the predictive process. This allows the control device 100 to calculate the predictive value of the latency of the VM by using the JIT modeling, and to predict the load of the information processing device 201 in the data center.

Example of Control Process Procedure According to Exemplary Example 2

Subsequently, an example of a control process procedure according to exemplary example 2 will be described with reference to FIG. 19.

Figure 19:
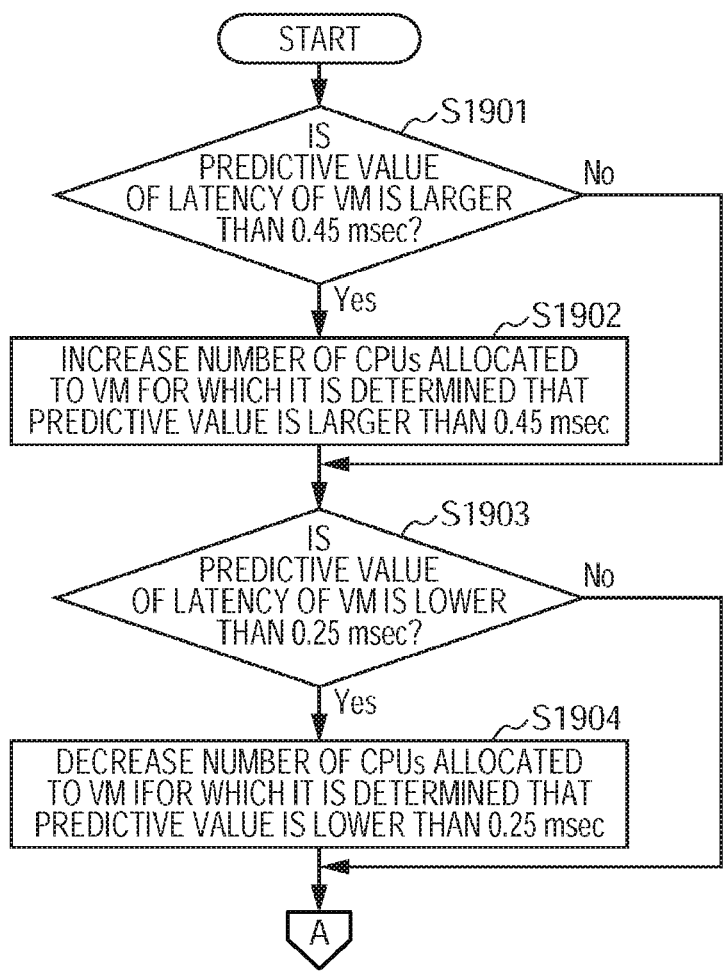
FIG. 19 is a diagram illustrating an example of an operational flowchart for a control process procedure, according to an embodiment.

FIG. 19 is a flowchart illustrating the example of the control process procedure according to the example 2. In FIG. 19, the control device 100 determines whether or not the predictive value of the latency of the VM exceeds 0.45 msec (step S1901). Here, when the predictive value of the latency of the VM does not exceed 0.45 msec (step S1901: No), the control device 100 proceeds to a process in step S1903.

In contrast, when the predictive value of the latency of the VM exceeds 0.45 msec (step S1901: Yes), the control device 100 increases the number of CPUs allocated to the VM for which it is determined that the predictive value of the latency exceeds 0.45 msec (step S1902). For example, the control device 100 increases the number of CPUs which are allocated to the VM, for which it is determined that the predictive value of the latency exceeds 0.45 msec, by 1.

Subsequently, the control device 100 determines whether or not the predictive value of the latency of the VM is lower than 0.25 msec (step S1903). Here, when the predictive value of the latency of the VM is not slower than 0.25 msec (step S1903: No), the control device 100 proceeds to a process in step S1501 of FIG. 15.

In contrast, when the predictive value of the latency of the VM is lower than 0.25 msec (step S1903: Yes), the control device 100 reduces the number of CPUs which are allocated to the VM for which it is determined that the predictive value of the latency of the VM is lower than 0.25 msec (step S1904). For example, the control device 100 decreases the number of CPUs which are allocated to the VM, for which it is determined that the predictive value of the latency of the VM is lower than 0.25 msec, by 1. Furthermore, the control device 100 proceeds to a process in step S1501 of FIG. 15. This allows the control device 100 to efficiently reduce the power consumption of the data center while satisfying the SLA.

Example of Operation of Control Device 100 According to Example 3

Subsequently, an example of an operation of a control device 100 according to example 3 will be described with reference to FIGS. 20 and 21.

FIGS. 20 and 21 are explanatory diagrams illustrating the example of the operation of the control device 100 according to the example 3. Similarly to FIG. 7, the control device 100 acquires operation data from the information processing device 201 every fixed time by using the JIT predictive software 600, and stores the operation data in the DB 400.

In FIG. 20, the control device 100 receives a predictive demand which designates time-series data relevant to throughput as the predictive target reference data which is the predictive target. When the predictive demand is received, the control device 100 calculates a correlation coefficient between time-series data relevant to throughput and time-series data relevant to other metric system which are different from the throughput. For example, the control device 100 substitutes the CPU use rate of the Equation (1) for throughput, and calculates the correlation coefficient between the time-series data relevant to throughput and the time-series data relevant to the amount of transmission/reception data.

The control device 100 sorts the plurality of metric systems in descending order of the calculated correlation coefficient. The control device 100 sets metric systems included in tenth in ranking as metric systems, which are used for the JIT modeling in order to acquire a predictive value of the throughput, among the plurality of sorted metric systems. This allows the control device 100 to reduce time to be taken for the JIT modeling while suppressing the accuracy of the JIT modeling from being lowered. Subsequently, proceeding to description with reference to FIG. 21.

In FIG. 21, the control device 100 searches the time-series data relevant to the selected respective metric systems for a proximity data set which is a set of performance values of the past time point at which L2 norm to the latest data set that is a set of the performance values of the latest time points is equal to or smaller than the prescribed threshold. For example, the control device 100 calculates L2 norm between the latest data set and the past data set which is a set of the performance values at respective past time points by using Equation (2).

Furthermore, the control device 100 specifies ten past data sets from a side on which the calculated L2 norm is smaller, as the proximity data set among the past data sets. The control device 100 may specify the past data set, for which the calculated L2 norm is equal to or smaller than the prescribed threshold, as the proximity data set among the past data sets.

Subsequently, the control device 100 calculates the predictive value of the throughput for each specified proximity data set by substituting the throughput for the CPU use rate of Equation (3). For example, the control device 100 calculates the predictive value of the throughput using a j-th proximity data set among n proximity data sets.

Subsequently, the control device 100 calculates the statistic value of the predictive values of the throughput calculated by substituting the throughput for the CPU use rate of Equation (4). For example, the control device 100 calculates an average value as the statistic value. The control device 100 may calculate a central value or a percentile as the statistic value.

Thereafter, similarly to FIG. 11, the control device 100 controls the calculation resources of the information processing device 201, based on the calculated predictive value of the throughput. An example of the calculation resources is the CPU resource. The control is performed to change allocation of the calculation resource to be provided to the VM which is executed by the information processing device 201. The control may be performed to change power to be supplied to the calculation resources of the information processing device 201.

In the example of FIG. 21, specifically, in a case where it is demanded that the throughput exceeds 500 ops/sec as the SLA, the control device 100 increases the CPU resources which are allocated to the VM when the predictive value of the throughput falls below 550 ops/sec. In other words, when there is relatively high possibility that the throughput does not satisfy the SLA, the control device 100 is able to increase the CPU resources which are allocated to the VM. This allows the control device 100 to reduce the possibility that a period which does not satisfy the SLA is generated.

In addition, for example, when the predictive value of the throughput exceeds 1000 ops/sec, the control device 100 may reduce the CPU resources which are allocated to the VM while satisfying the SLA. In other words, when there is a relatively small possibility that the throughput does not satisfy the SLA, the control device 100 is able to reduce the CPU resources which are allocated to the VM. This allows the control device 100 to efficiently reduce the power consumption of the data center while satisfying the SLA.

As described above, the control device 100 is able to reduce the power consumption of the data center. Furthermore, the control device 100 is able to reduce a possibility that a period in which the SLA is not satisfied is generated even though the power consumption is reduced. For example, the control device 100 is able toc cause difference between an actually measured value and the approximately 98% of the predictive values of the throughput to be lower than ±10% by using the JIT modeling. Furthermore, for example, the control device 100 is able to cause difference between the actually measured value and the approximately 2% of the predictive values of the throughput to be lower than ±20%.

Here, as described above, when the predictive value of the throughput is lower than 550 ops/sec, the control device 100 increases the CPU resources which are allocated to the VM. This allows the control device 100 to suppress a possibility that the throughput is lower than 500 ops/sec to approximately 2%. In addition, when the predictive value of the throughput is lower than 600 ops/sec, the control device 100 may increase the CPU resources which are allocated to the VM. This allows the control device 100 to further reduce the possibility that the throughput is lower than 500 ops/sec.

Example of Predictive Process Procedure According to Exemplary Example 3

Subsequently, an example of a predictive process procedure according to the example 3 will be described with reference to FIG. 22.

Figure 22:
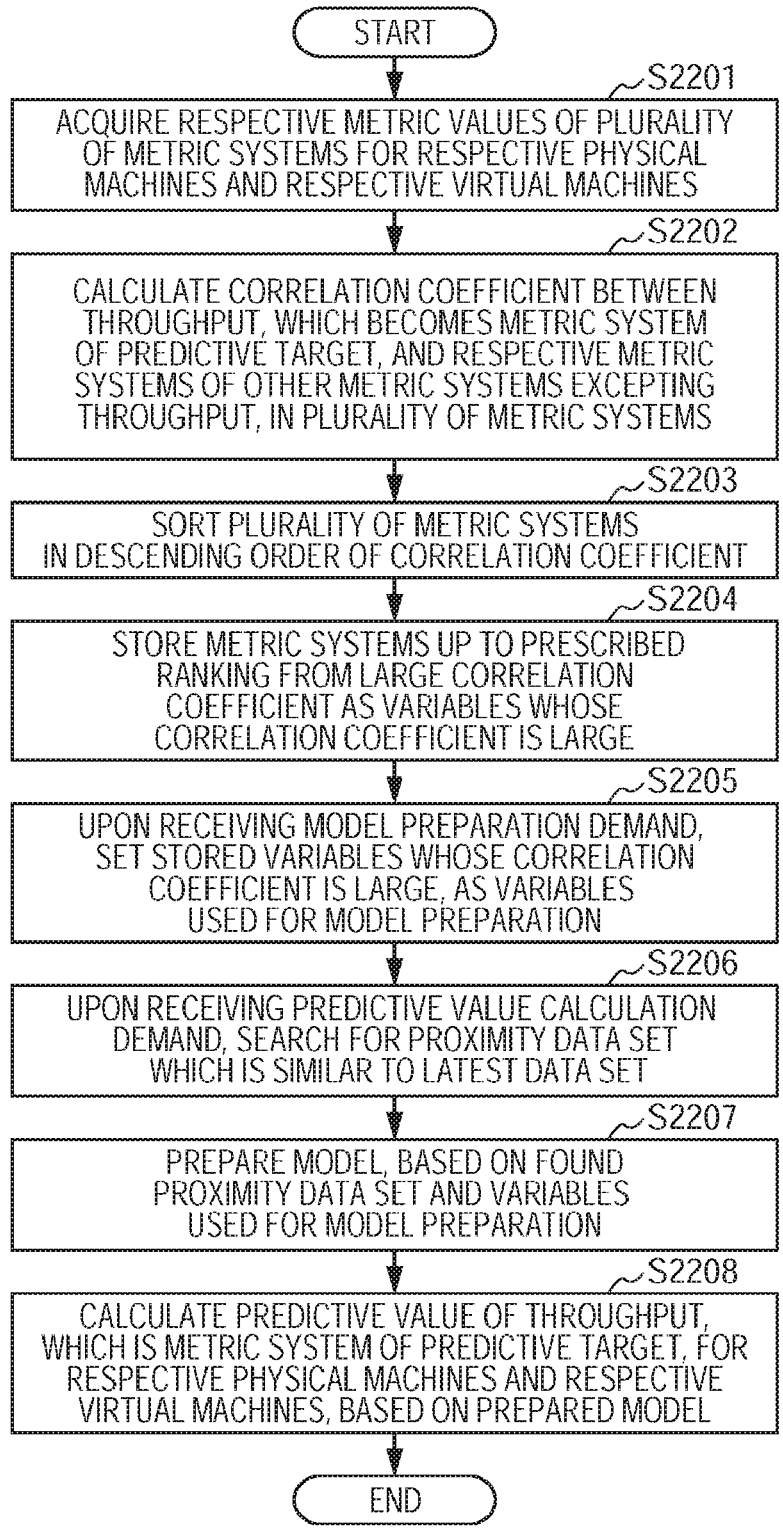
FIG. 22 is a diagram illustrating an example of an operational flowchart for a predictive process procedure, according to an embodiment.

FIG. 22 is a flowchart illustrating the example of the predictive process procedure according to exemplary example 3. In FIG. 22, the control device 100 acquires the respective metric values of the plurality of metric systems for the respective physical machines and the respective virtual machines (step S2201).

Subsequently, the control device 100 calculates a correlation coefficient between the throughput, which is the metric system of the predictive target, and each of the metric systems of other metric systems excepting the throughput which is the metric system of the predictive target among the plurality of metric systems (step S2202). Furthermore, the control device 100 sorts the plurality of metric systems in descending order of correlation coefficient (step S2203).

Subsequently, control device 100 stores the metric systems up to a prescribed ranking from a larger correlation coefficient, as variables whose correlation coefficient are large (step S2204). Furthermore, when the model preparation demand is received, the control device 100 sets the stored variables whose correlation coefficient is large, as variables used for model preparation (step S2205).

Subsequently, when the predictive value calculation demand is received, the control device 100 searches for a proximity data set for which the L2 norm to the latest data set is equal to or smaller than the prescribed threshold (step S2206). Furthermore, the control device 100 prepares a model, based on the found proximity data set and the set variables used for model preparation (step S2207).

Subsequently, the control device 100 calculates a predictive value of the throughput, which is the metric system of the predictive target, for each of the physical machines and each of the virtual machines, based on the prepared model (step S2208). Furthermore, the control device 100 ends the predictive process. In this way, the control device 100 is able to calculate the predictive value of the CPU use rate of the VM by using the JIT modeling, and is able to predict the load of the information processing device 201 in the data center.

Example of Control Process Procedure According to Exemplary Example 3

Subsequently, an example of a control process procedure according to exemplary example 3 will be described with reference to FIG. 23.

Figure 23:
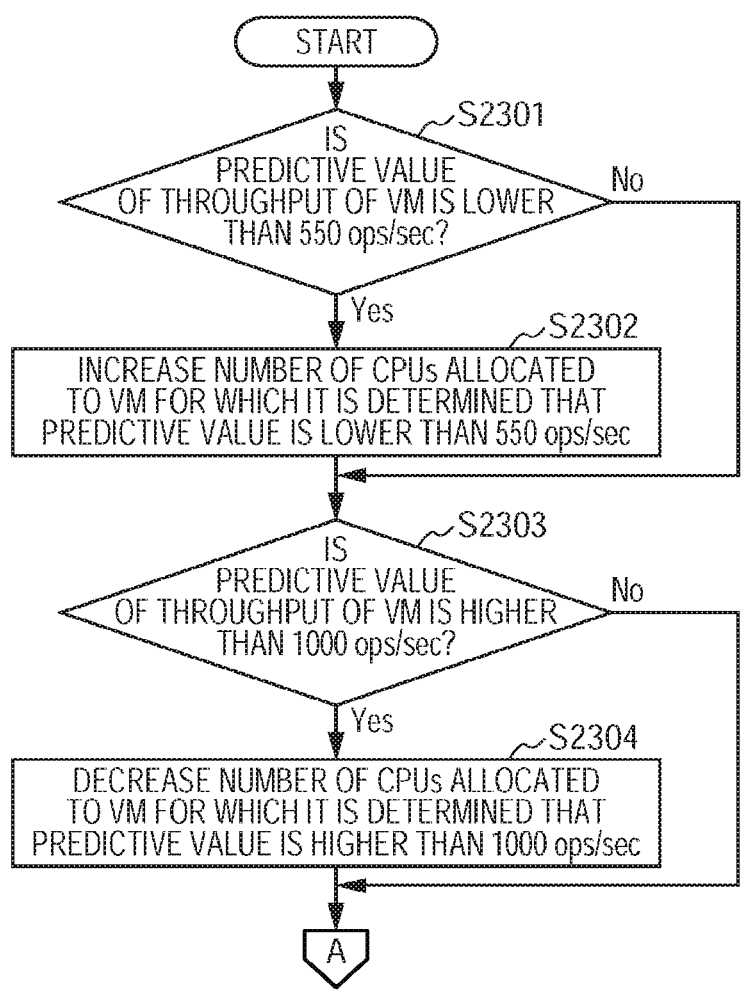
FIG. 23 is a diagram illustrating an example of an operational flowchart for a control process procedure, according to an embodiment.

FIG. 23 is a flowchart illustrating the example of the control process procedure according to the example 3. In FIG. 23, the control device 100 determines whether or not the predictive value of the throughput of the VM is lower than 550 ops/sec (step S2301). Here, when the predictive value of the throughput of the VM is not lower than 550 ops/sec (step S2301: No), the control device 100 proceeds to a process in step S2303.

In contrast, when the predictive value of the throughput of the VM is lower than 550 ops/sec (step S2301: Yes), the control device 100 increases the number of CPUs allocated to the VM for which it is determined that the predictive value of the throughput of the VM is lower than 550 ops/sec (step S2302). For example, the control device 100 increases the number of CPUs which are allocated to the VM for which it is determined that the predictive value of the throughput of the VM exceeds 550 ops/sec, by 1.

Subsequently, the control device 100 determines whether or not the predictive value of the throughput of the VM exceeds 1000 ops/sec (step S2303). Here, when the predictive value of the throughput of the VM does not exceed 1000 ops/sec (step S2303: No), the control device 100 proceeds to a process in step S1501 of FIG. 15.

In contrast, when the predictive value of the throughput of the VM exceeds 1000 ops/sec (step S2303: Yes), the control device 100 reduces the number of CPUs which are allocated to the VM for which it is determined that the predictive value of the throughput of the VM exceeds 1000 ops/sec (step S2304). For example, the control device 100 decreases the number of CPUs which are allocated to the VM for which it is determined that the predictive value of the throughput of the VM exceeds 1000 ops/sec, by 1. Furthermore, the control device 100 proceeds to a process in step S1501 of FIG. 15. In this way, the control device 100 is able to efficiently reduce the power consumption of the data center while satisfying the SLA.

As described above, according to the control device 100, it is possible to store the plurality of reference data which are selected based on the operation data which are input from the host OS executed by the information processing device 201. In addition, according to the control device 100, it is possible to select one or more selection reference data from the plurality of reference data, based on a plurality of correlation coefficients which are calculated based on the input predictive demand and which indicate respective correlations between the predictive target reference data, which is the predictive target, and other reference data. In addition, according to the control device 100, it is possible to calculate the predictive value of the predictive target reference data, based on the one or more selected selection reference data. In addition, according to the control device 100, it is possible to control the calculation resources of the information processing device 201, based on the calculated predictive value of the predictive target reference data and the predetermined reference values.

Therefore, the control device 100 is able to calculate the predictive value of the predictive target reference data which is the predictive target, and is able to predict loads for the calculation resources of the information processing device 201 of the data center, based on the calculated predictive value. Accordingly, the control device 100 is able to control the calculation resources of the information processing device 201 such that the power consumption of the data center is efficiently reduced while satisfying the SLA.

Furthermore, the control device 100 is able to select the reference data to be used when the predictive value is calculated among the plurality of reference data based on the correlation coefficient, and is able to reduce time which is taken when the predictive value is calculated. Accordingly, the control device 100 is able to suppress control performed on the calculation resources from being not in time up to load variation timing for the calculation resources of the data center because time is taken to calculate the predictive value. As a result, the control device 100 is able to reduce the possibility that a period which does not satisfy the SLA is generated.

According to the control device 100, it is possible to specify the performance value for each of the one or more pieces of selection reference data at the time point before the prescribed time point at which L2 norm to the performance values of the prescribed time point is equal to or smaller than the prescribed threshold. In addition, according to the control device 100, it is possible to calculate the statistic value of the predictive values of the predictive target reference data, based on the specified performance values. Therefore, the control device 100 is able to efficiently calculate the statistic value of the predictive values of the predictive target reference data by using the JIT modeling.

The control device 100 is able to specify the performance value of the time point before the prescribed time point, at which the L2 norm to the performance value of the prescribed time point is equal to or smaller than the prescribed threshold, for each of the respective pieces of selection reference data. In addition, the control device 100 is able to calculate the statistic value of the predictive values of the predictive target reference data, based on the specified performance values. Therefore, the control device 100 is able to efficiently calculate the statistic value of the predictive values of the predictive target reference data by using the JIT modeling.

According to the control device 100, it is possible to use a performance value demanded by the user or a performance value to which margin is added so as to indicate that performance is higher than that of the performance value demanded by the user, as the reference value. In addition, according to the control device 100, in a case where the calculated predictive value of the predictive target reference data is a performance value which indicates that the performance is lower than that of the reference value, it is possible to increase the calculation resources of the information processing device 201, which is allocated to the VM. Therefore, in a case where there is a high possibility that it is difficult to secure the performance value demanded by the user, the control device 100 is able to satisfy the SLA, based on the predictive value, by increasing the calculation resources of the information processing device 201, which is allocated to the VM.

According to the control device 100, it is possible to use a performance value, which indicates that performance is higher than the performance value demanded by the user, and which is able to be secured even though a certain or more calculation resources are not used among the calculation resources which are being currently allocated, as the reference value. In addition, according to the control device 100, in a case where the calculated predictive value of the predictive target reference data is a performance value which indicates that the performance is higher than that of the reference value, it is possible to reduce the calculation resources of the information processing device 201, which is allocated to the VM. Therefore, the control device 100 is able to reduce the power consumption of the data center.

According to the control device 100, in a case where there is no VM to which the calculation resources of the information processing device 201 are allocated as a result of control performed on the calculation resources of the information processing device 201, it is possible to stop to supply power to the information processing device 201. This allows the control device 100 to reduce the power consumption of the data center.

Meanwhile, it is possible to realize the control method according to the embodiment by causing a computer, such as a personal computer or a work station, to execute a prepared program. The control program is stored in a computer-readable recording medium, such as a hard disk, a flexible disk, a CD-ROM, a MO, or a DVD, and is executed by being read from the recording medium by the computer. In addition, the control program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for managing an information processing device including a plurality of calculation resources, the apparatus comprising:
   a memory configured to store plural pieces of reference data selected based on operation data input from a host operating system (OS) executed by the information processing device including a first processor; and
   a second processor coupled to the memory and configured to:
      select one or more pieces of selection reference data from the plural pieces of reference data, based on a plurality of correlation coefficients which are calculated upon receiving a predictive demand and which respectively indicate correlations between predictive target reference data indicating reference data to be predicted and other reference data,
      calculate predictive values of the predictive target reference data, based on the selected one or more pieces of selection reference data, and
      control the plurality of calculation resources for the information processing device, based on the predictive values of the predictive target reference data and a predetermined reference value, wherein
   the calculation resources of the information processing device are calculation resources that are allowed to be allocated to a virtual machine of the information processing device,
   the predetermined reference value is a performance value indicating a state relevant to the virtual machine of a predetermined information processing device, and
   the second processor is further configured to control an amount of the calculation resources of the information processing device, depending on a result of comparing a performance value indicated by the predictive value of the predictive target reference data with a performance value indicated by the predetermined reference value.

2. The apparatus of claim 1, wherein
the reference data includes performance values at a plurality of respective time points; and
the second processor is further configured to:
   for each of the one or more pieces of selection reference data, specify first performance values at a first time point before a predetermined time point, for which L2 norm between the first performance values at the first time point and second performance values at the predetermined time point is equal to or smaller than a predetermined threshold, and
   calculate a statistic value of the predictive values of the predictive target reference data, based on the specified first performance values.

3. The apparatus of claim 1, wherein
the second processor is further configured to, when the predictive value of the predictive target reference data is a performance value indicating performance that is lower than performance indicated by the predetermined reference value, increase the calculation resources of the information processing device that are to be allocated to the virtual machine.

4. The apparatus of claim 1, wherein
the second processor is further configured to, when the predictive value of the predictive target reference data is a performance value indicating performance that is higher than performance indicated by the predetermined reference value, decrease the calculation resources of the information processing device that are to be allocated to the virtual machine.

5. The apparatus of claim 4, wherein the second processor is further configured to stop supplying power to the information processing device when a virtual machine to which the calculation resources of the information processing device are allocated does not exist as a result of controlling the calculation resources of the information processing device.

6. A method for controlling an information processing device including a plurality of calculation resources, the method comprising:
   storing plural pieces of reference data selected based on operation data input from a host OS executed by the information processing device;
   selecting one or more pieces of selection reference data from the plural pieces of reference data, based on a plurality of correlation coefficients which are calculated upon receiving a predictive demand and which respectively indicate correlations between predictive target reference data indicating reference data to be predicted and other reference data;

calculating predictive values of the predictive target reference data, based on the selected one or more pieces of selection reference data; and controlling the plurality of calculation resources for the information processing device, based on the predictive values of the predictive target reference data and a predetermined reference value, wherein the calculation resources of the information processing device are calculation resources that are allowed to be allocated to a virtual machine of the information processing device, the predetermined reference value is a performance value indicating a state relevant to the virtual machine of a predetermined information processing device, and an amount of the calculation resources of the information processing device is controlled depending on a result of comparing a performance value indicated by the predictive value of the predictive target reference data with a performance value indicated by the predetermined reference value.

7. A non-transitory, computer-readable recording medium having stored therein a program for causing a computer for controlling an information processing device including a plurality of calculation resources, to execute a process comprising:

storing plural pieces of reference data selected based on operation data input from a host OS executed by the information processing device;

selecting one or more pieces of selection reference data from the plural pieces of reference data, based on a plurality of correlation coefficients which are calculated upon receiving a predictive demand and which respectively indicate correlations between predictive target reference data indicating reference data to be predicted and other reference data;

calculating predictive values of the predictive target reference data, based on the selected one or more pieces of selection reference data; and controlling the plurality of calculation resources for the information processing device, based on the predictive values of the predictive target reference data and a predetermined reference value, wherein the calculation resources of the information processing device are calculation resources that are allowed to be allocated to a virtual machine of the information processing device, the predetermined reference value is a performance value indicating a state relevant to the virtual machine of a predetermined information processing device, and an amount of the calculation resources of the information processing device is controlled depending on a result of comparing a performance value indicated by the predictive value of the predictive target reference data with a performance value indicated by the predetermined reference value.

* * * * *